US012145234B2

(12) United States Patent
Zhang et al.

(10) Patent No.: US 12,145,234 B2
(45) Date of Patent: Nov. 19, 2024

(54) SANDING TOOL

(71) Applicant: Nanjing Chervon Industry Co., Ltd., Nanjing (CN)

(72) Inventors: Lisong Zhang, Nanjing (CN); Li Xing, Nanjing (CN)

(73) Assignee: Nanjing Chervon Industry Co., Ltd. (CN)

(*) Notice: Subject to any disclaimer, the term of this patent is extended or adjusted under 35 U.S.C. 154(b) by 584 days.

(21) Appl. No.: 17/500,243

(22) Filed: Oct. 13, 2021

(65) Prior Publication Data

US 2022/0143774 A1 May 12, 2022

(30) Foreign Application Priority Data

Nov. 12, 2020 (CN) ......................... 202011264256.5
Jan. 11, 2021 (CN) ......................... 202110029163.2
Jul. 12, 2021 (CN) ......................... 202110786030.X

(51) Int. Cl.
*B24B 23/02* (2006.01)
*B24B 23/04* (2006.01)
*B24B 41/04* (2006.01)
*B24B 47/12* (2006.01)
*B25F 5/02* (2006.01)

(52) U.S. Cl.
CPC ............ *B24B 23/02* (2013.01); *B24B 23/028* (2013.01); *B24B 23/04* (2013.01); *B24B 41/04* (2013.01); *B24B 47/12* (2013.01); *B25F 5/02* (2013.01)

(58) Field of Classification Search
CPC ............. B23Q 5/12; B24B 7/18; B24B 7/182; B24B 7/186; B24B 23/03; B24B 23/028; B24B 23/04; B24B 23/043; B24B 47/12; B24B 41/04; B24B 41/047; B24B 41/0475; F16H 1/145; F16H 1/203
USPC ......................... 451/357, 359, 344, 294, 356
See application file for complete search history.

(56) References Cited

U.S. PATENT DOCUMENTS 2,696,125 A * 12/1954 Saari ......................... B23F 5/24 74/459.5
6,009,767 A * 1/2000 Rudolph ................ F16H 37/12 475/11
7,291,061 B2 11/2007 Kiss
(Continued)

FOREIGN PATENT DOCUMENTS

CN 209793391 U 12/2019
CN 209868288 U 12/2019
(Continued)

*Primary Examiner* — Makena S Markman
(74) *Attorney, Agent, or Firm* — Greenberg Traurig, LLP

(57) ABSTRACT

A sanding tool includes a machine body, a power supply, a base plate assembly, a drive mechanism, and a control mechanism. The machine body includes a casing. The base plate assembly includes a base plate. The drive mechanism is disposed in the casing and includes a motor and an output shaft, the motor has a motor shaft rotating around a first axis, the output shaft rotates around a second axis, and the output shaft transmits power to the base plate assembly. The control mechanism is electrically connected to the motor and configured to control the sanding tool to operate. The first axis and the second axis form an included angle and are not in the same plane. A battery pack and the motor are disposed on two sides of the output shaft.

19 Claims, 31 Drawing Sheets

(56) References Cited

U.S. PATENT DOCUMENTS

| | | | | |
|---|---|---|---|---|
| 2010/0009608 | A1* | 1/2010 | Lo | B24B 23/028 451/357 |
| 2020/0254580 | A1* | 8/2020 | Valentini | B24B 41/04 |

FOREIGN PATENT DOCUMENTS

| | | | |
|---|---|---|---|
| CN | 210113015 | U | 2/2020 |
| CN | 212553186 | U | 2/2021 |
| CN | 213034321 | U | 4/2021 |
| EP | 2607016 | A2 | 6/2013 |
| JP | 2013063495 | A | 4/2013 |
| WO | 2014/119210 | A1 | 8/2014 |

* cited by examiner

SANDING TOOL

RELATED APPLICATION INFORMATION

This application claims the benefit under 35 U.S.C. § 119(a) of Chinese Patent Application No. CN 202011264256.5, filed on Nov. 12, 2020, Chinese Patent Application No. CN 202110029163.2, filed on Jan. 11, 2021, and Chinese Patent Application No. CN 202110786030.X, filed on Jul. 12, 2021, which are incorporated by reference in their entirety herein.

BACKGROUND

A sanding tool is a commonly used power tool and used for polishing and sanding surfaces of woods, plastics, stones, metals, and other materials through the swing of a base plate. While satisfying a sanding function, a handheld sanding tool generally should also have a relatively small volume and weight to satisfy the desire of a user for a convenient operation and improve user experience. However, as the power of the sanding tool increases, a drive motor disposed in the sanding tool generally has a relatively large volume so that the entire sanding tool has a greater volume. Therefore, how the sanding tool satisfies the requirements for a compact structure and miniaturization of the entire machine while having various functions becomes a technical problem to be solved urgently in the art.

SUMMARY

A sanding tool includes a machine body, a battery pack, a base plate assembly, a drive mechanism, and a control mechanism. The machine body includes a casing. The battery pack is disposed at a rear end of the machine body. The base plate assembly includes a base plate. The drive mechanism is disposed in the casing and includes a motor and an output shaft connected in a transmission manner, where the motor has a motor shaft rotating around a first axis, the output shaft rotates around a second axis, and the output shaft transmits power to the base plate assembly to drive the base plate assembly to move. The control mechanism is electrically connected to the motor and configured to control the sanding tool to operate. The first axis and the second axis form an included angle and are not in the same plane; and the battery pack and the motor are disposed on two sides of the output shaft.

In one example, the motor shaft is parallel to a plane where the base plate is located.

In one example, the battery pack includes a coupling surface on which a battery pack terminal is disposed, where the coupling surface is substantially perpendicular to the base plate and coupled to a coupling portion of the machine body.

In one example, the coupling surface of the battery pack is substantially parallel to the coupling portion of the machine body.

In one example, an included angle between a coupling surface of the battery pack and a plane where the base plate is located is greater than or equal to 0° and less than or equal to 120°.

In one example, the first axis of the motor shaft passes through the battery pack.

In one example, the motor includes a first extreme installation position and a second extreme installation position, where the first extreme installation position rotates in a plane parallel to the base plate by an included angle $\alpha$ with the output shaft as a center to reach the second extreme installation position.

In one example, the casing includes a left casing and a right casing that are divided relative to a center plane, and the first extreme installation position and the second extreme installation position are symmetrical about the center plane In one example, the included angle $\alpha$ is greater than or equal to 0° and less than or equal to 30°.

In one example, the sanding tool further includes a fan assembly, where the fan assembly includes cooling fan blades configured to form a cooling air path; the cooling air path includes a first cooling air path and a second cooling air path, where the first cooling air path passes through the motor, the second cooling air path passes through the control mechanism, and the first cooling air path and the second cooling air path intersect at the cooling fan blades.

In one example, the sanding tool further includes a first air inlet, a second air inlet, and an air outlet that are disposed on the casing; where the air outlet is disposed on the casing in correspondence to the cooling fan blades; the first air inlet is disposed in correspondence to the motor or disposed upstream of the motor along the first cooling air path; and the second air inlet is disposed in correspondence to the control mechanism or disposed upstream of the control mechanism along the second cooling air path.

In one example, the first air inlet is disposed on a front side of the casing and the second air inlet is disposed on a rear side of the casing.

In one example, a ratio of a projection of the battery pack on a height of the sanding tool to the height of the sanding tool is less than or equal to 0.7.

In one example, the drive mechanism further includes a transmission assembly disposed between the motor shaft and the output shaft, where the transmission assembly includes a first gear installed on the output shaft and a second gear installed on the motor shaft and engaged with the first gear; and a stagger distance between the first axis and the second axis is less than or equal to a radius of the first gear.

In one example, projections of the motor and the battery pack in a vertical direction perpendicular to the base plate overlap.

A sanding tool includes a machine body, a battery pack, a base plate assembly, a drive mechanism, and a control mechanism. The machine body includes a casing. The battery pack is configured to supply a power source to the sanding tool. The base plate assembly includes a base plate. The drive mechanism is disposed in the casing and includes a motor and an output shaft connected in a transmission manner, where the motor has a motor shaft rotating around a first axis, the output shaft rotates around a second axis, and the output shaft transmits power to the base plate assembly to drive the base plate assembly to move. The control mechanism is electrically connected to the motor and configured to control the sanding tool to operate. A direction along which the battery pack is plugged in and out is parallel to a plane where the base plate is located; the first axis and the second axis form an included angle and are not in the same plane; and a ratio of a diameter of the motor to a height of the sanding tool is greater than or equal to 0.2 and less than or equal to 0.6.

In one example, the ratio of the diameter of the motor to the height of the sanding tool is greater than or equal to 0.3 and less than or equal to 0.4.

In one example, a projection of the battery pack on the plane where the base plate is located overlaps with the base plate.

A sanding tool includes a machine body, a battery pack, a base plate assembly, a drive mechanism, and a control mechanism. The machine body includes a casing. The battery pack is configured to supply a power source to the sanding tool. The base plate assembly includes a base plate. The drive mechanism is disposed in the casing and includes a motor and an output shaft connected in a transmission manner, where the motor has a motor shaft rotating around a first axis, the output shaft rotates around a second axis, and the output shaft transmits power to the base plate assembly to drive the base plate assembly to move. The control mechanism is electrically connected to the motor and configured to control the sanding tool to operate. The first axis and the second axis form an included angle and are not in the same plane; and a distance between a center of the motor and the second axis of the output shaft is less than or equal to ½ of a length of the base plate.

In one example, the casing includes a body casing and a functional casing; where the functional casing includes a dust collection box and dust collection channels that are integrally formed, where the dust collection channels pass through the body casing and are detachably installed on the base plate assembly; and the body casing is provided with a gas discharge port for discharging gas in the dust collection box.

The present disclosure has the following beneficial effects: the motor is disposed transversely and the battery pack is plugged transversely, thereby reducing the height of the sanding tool and improving the compactness of the entire machine.

DETAILED DESCRIPTION

The present disclosure is described below in detail in conjunction with drawings and examples. It is to be understood that the examples described herein are intended to explain the present disclosure and not to limit the present disclosure.

Figure 1:
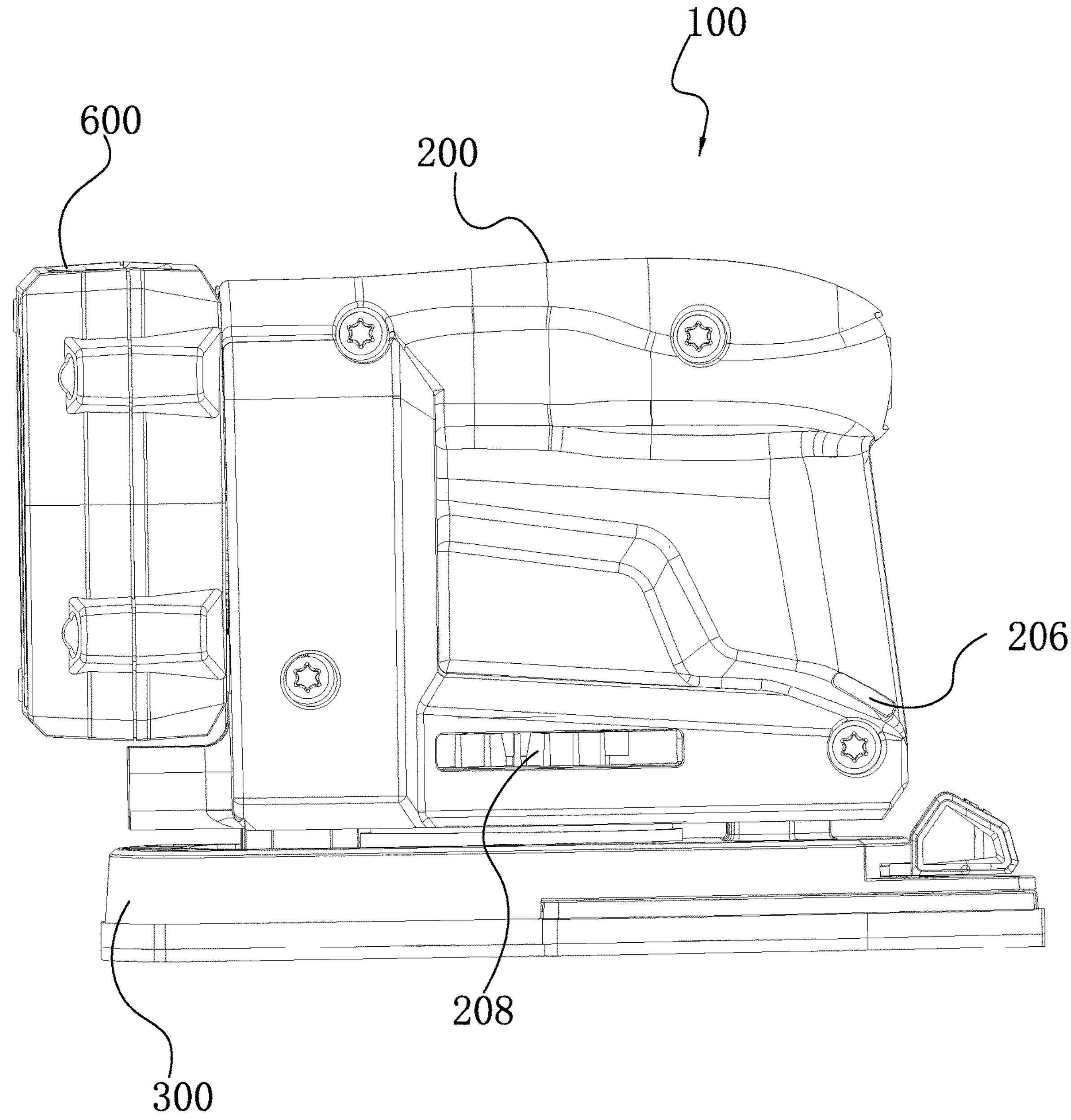
FIG. 1 is a structure view of a power tool according to an example.

FIG. 1 shows a sanding tool 100 in an example of the present disclosure. The sanding tool 100 in examples of the present disclosure is specifically a sander and more specifically a flat sander that can be held and operated by a user with one hand or two hands. It is to be understood that the sanding tool 100 may be a round sander, a triangular sander, a square sander, a special-shaped sander, etc., as long as the sanding tool can satisfy technical solutions of the present disclosure and any applicable sanding tool is within the scope of the present disclosure.

Figure 7:
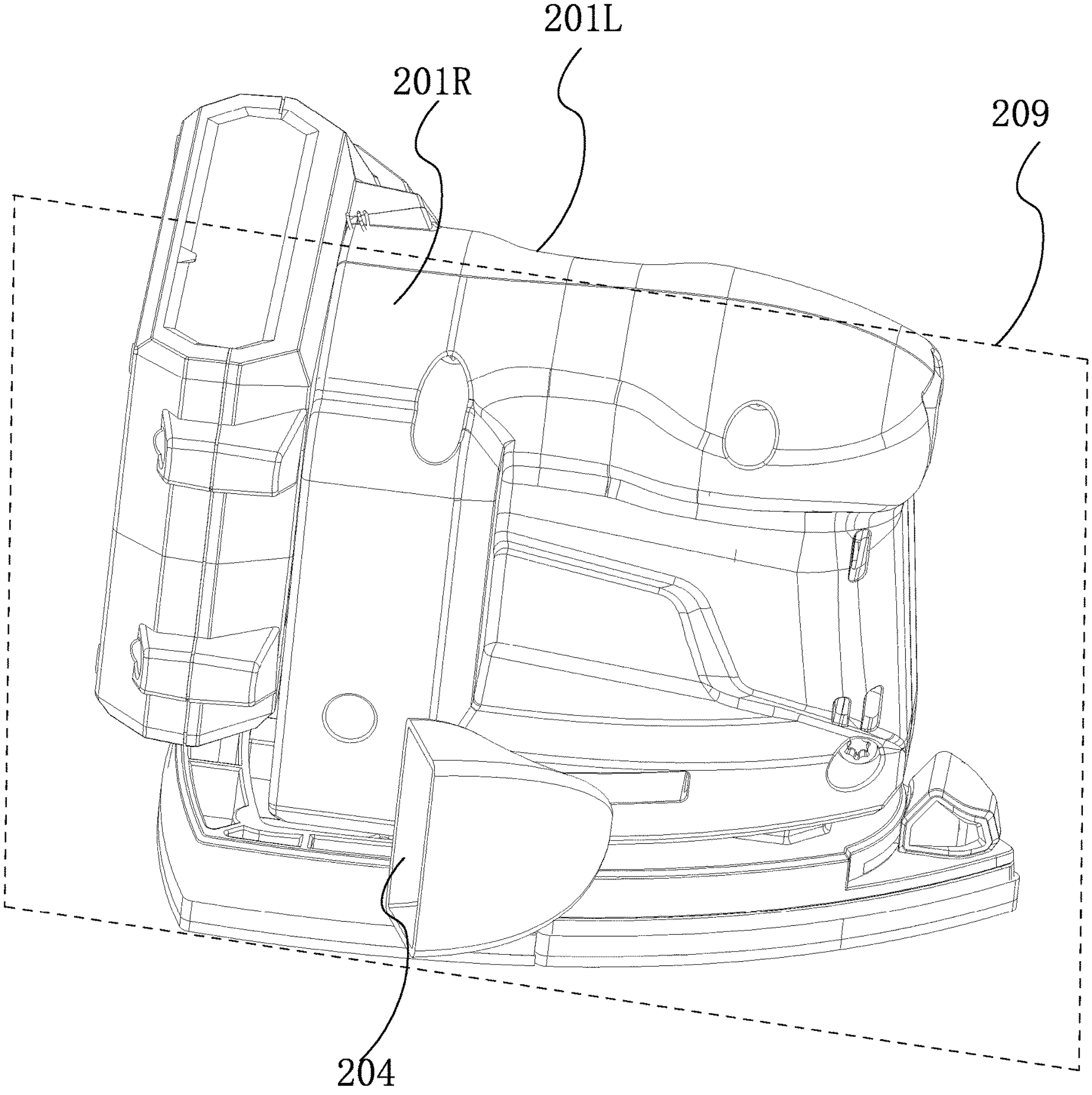
FIG. 7 is a structure view of a power tool according to an example.

The sanding tool 100 in the examples of the present disclosure includes at least a machine body 200, a base plate assembly 300, a control mechanism 400, a fan assembly 500, a power supply 600, and a drive mechanism 700. As shown in FIG. 7, the machine body 200 includes a casing 201, where the casing 201 includes a left casing 201L and a right casing 201R that are divided relative to a center plane 209. The drive mechanism 700 and the control mechanism 400 are both disposed inside the casing 201, and the drive mechanism 700 includes a motor 701 and an output shaft 702. The power supply 600 may be a direct current (DC) power supply such as a battery pack or may be an alternating current (AC) power supply.

Figure 8:
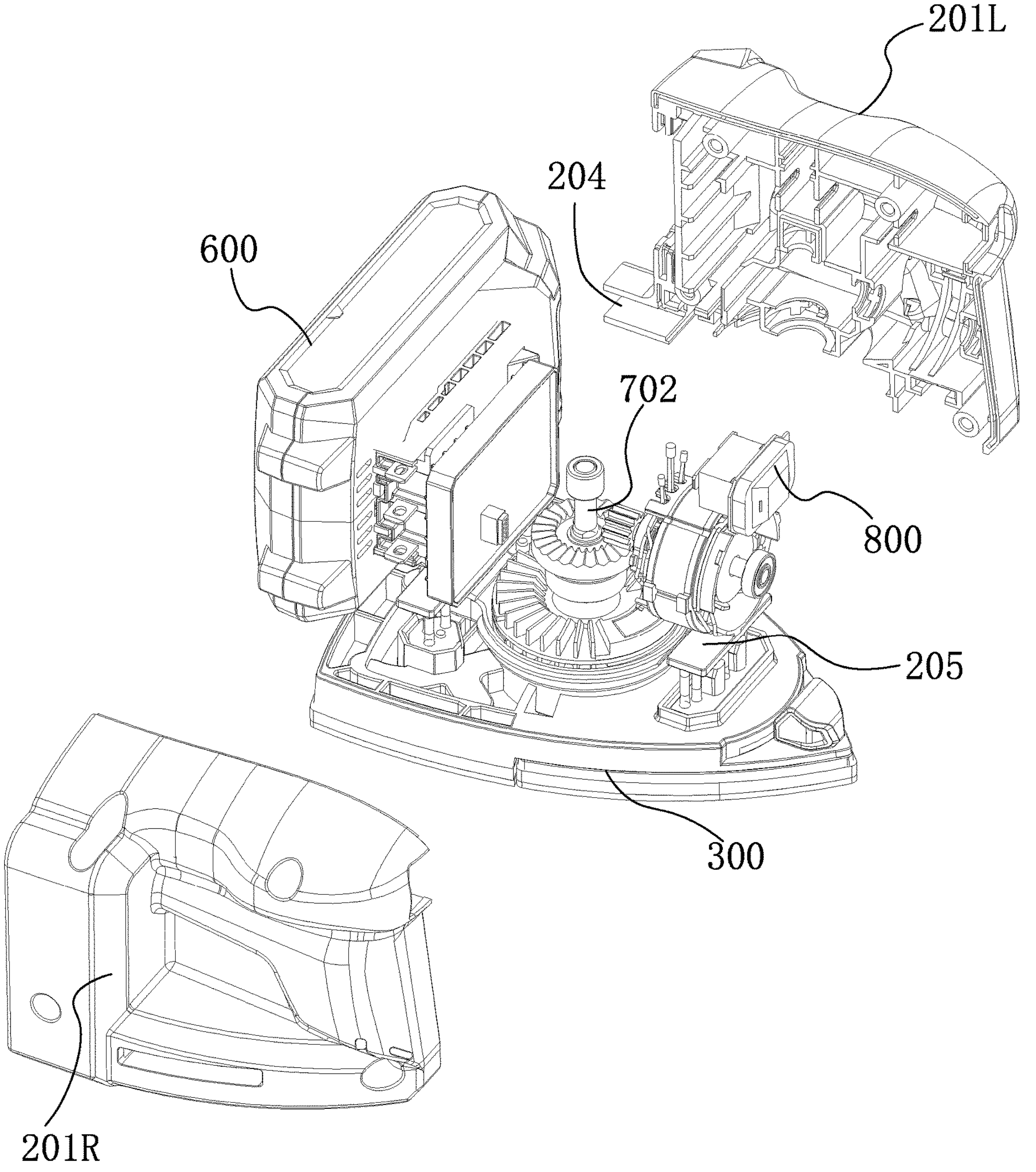
FIG. 8 is a schematic view illustrating the assembly of the sanding tool of FIG. 1.

Referring to FIG. 8, at least two support frames 205 are fixed on a base plate 301. During assembly, the left casing 201L and the right casing 201R are closed to the middle respectively in left and right directions, and the support frames 205 are correspondingly engaged with limiting ribs in the left casing 201L and the right casing 201R. Further, the left casing and the right casing are fastened by screws. During disassembly, the screws for fixing the left casing and the right casing are removed so that the two casings can be separated in the left and right directions, respectively.

Figure 2:
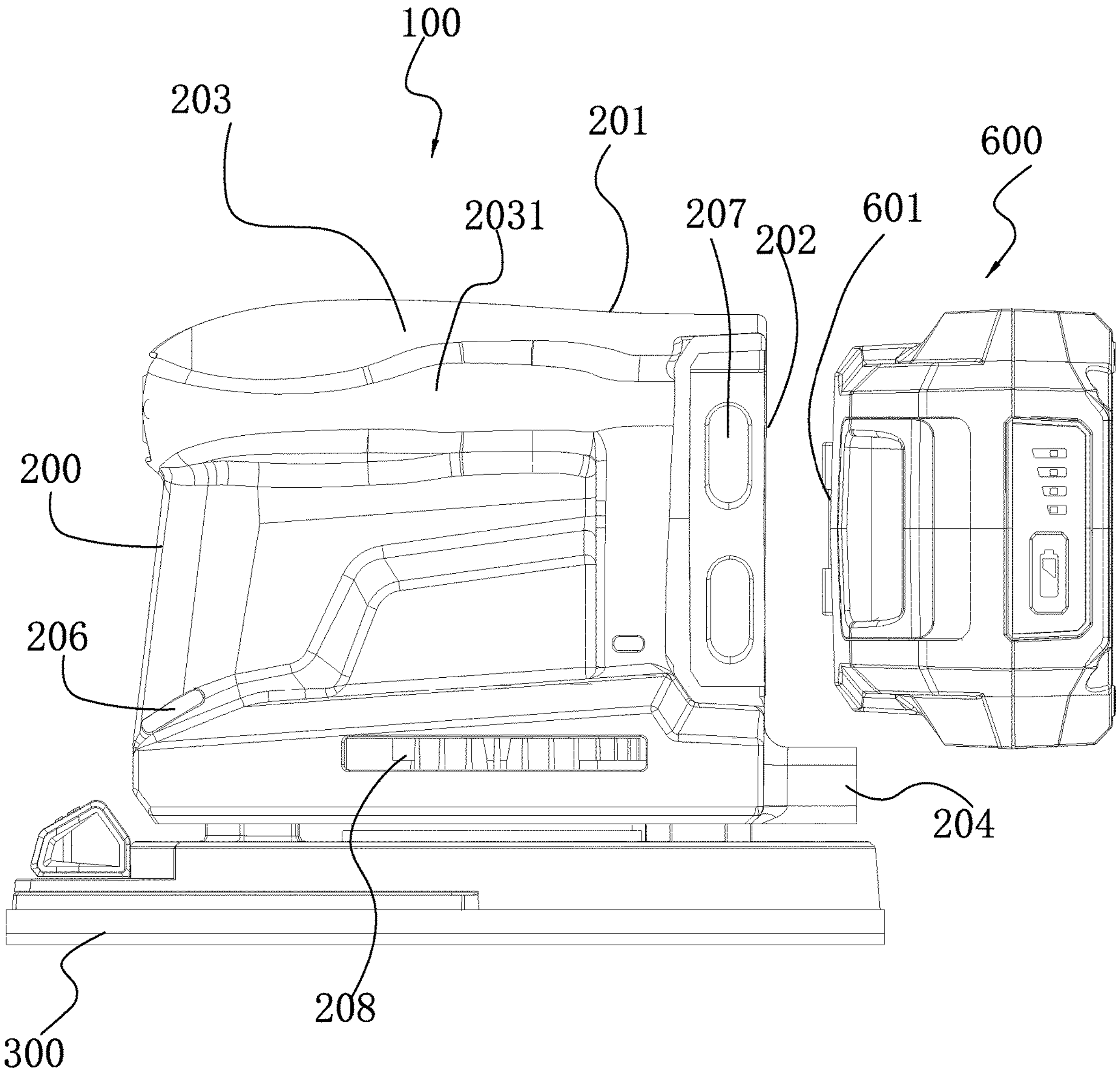
FIG. 2 is a schematic view illustrating the assembly of a sanding tool of FIG. 1.

Referring to FIG. 2, a holding portion 203 is disposed at the top of the machine body 200 for the user to hold. In an example, the holding portion 203 is designed with an arc conforming to the mechanics of one-hand holding or two-hand holding. A gripping unit 2031 recessed into the inside of the casing 201 is disposed at a bottom end of the holding portion 203 so that the machine body can be held more closely with one hand or two hands.

The base plate assembly 300 includes the base plate 301 and a sanding piece fixed on the base plate 301. A flat surface is formed on the base plate 301, and the sanding piece is disposed on a side of the base plate 301 facing away from a casing assembly. The sanding piece may be sandpaper or other types of abrasive or polishing parts and may be removably attached to the base plate in a conventional manner such as hook and loop connectors and/or clamp retainers. The base plate 301 is provided with a base plate dust suction port configured to suck dust generated during an operation.

Figure 4A:
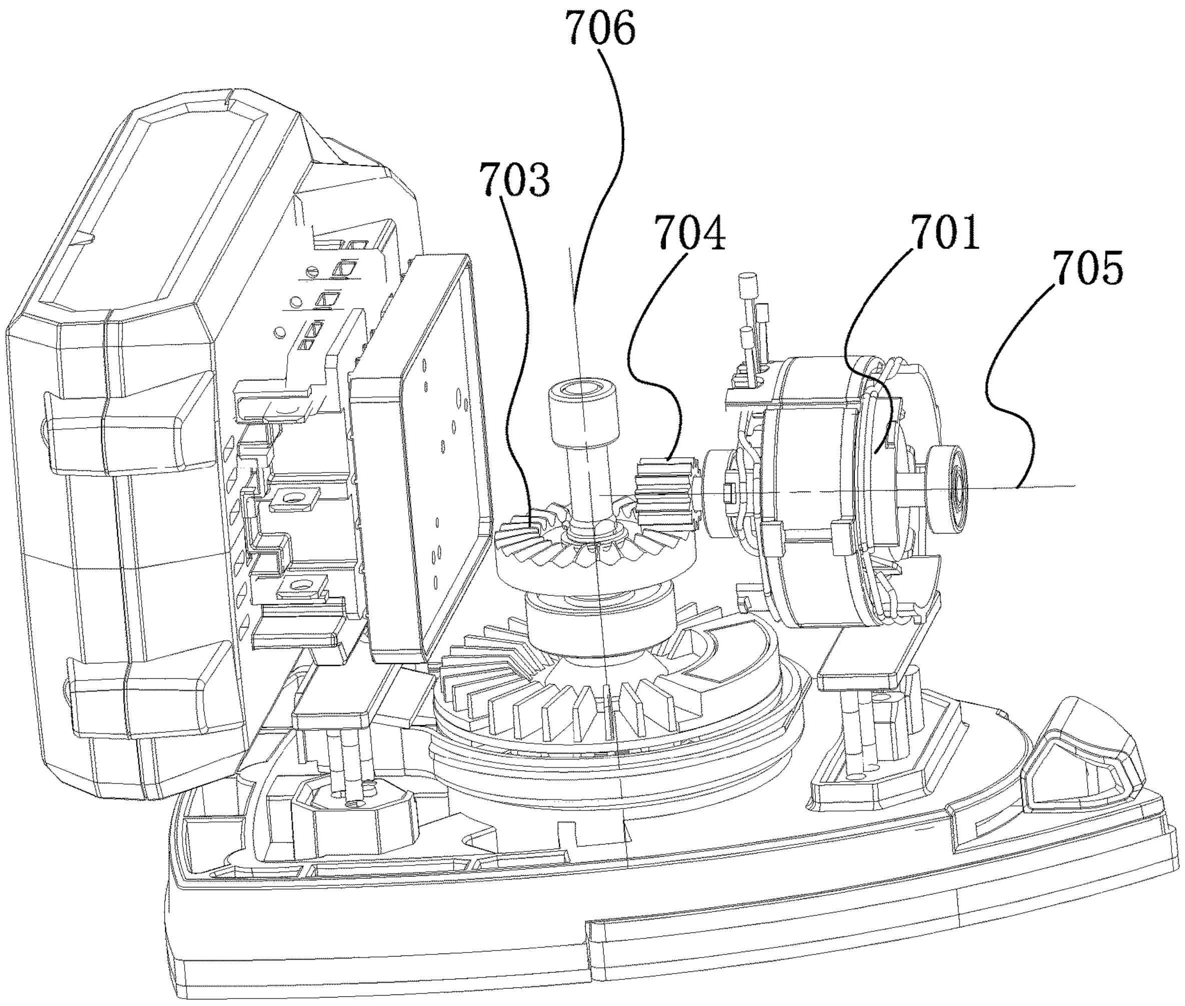

The drive mechanism 700 is configured to drive the base plate assembly 300 to move. Specifically, the drive mechanism 700 includes the motor 701 and the output shaft 702 connected in a transmission manner. The motor 701 has a motor shaft 701*a* rotating around a first axis 705; the output shaft 702 rotates around a second axis 706, and the output shaft 702 transmits power to the base plate assembly 300 to drive the base plate assembly 300 to move. It is to be understood that the drive mechanism 700 may further include a transmission assembly 700*a* disposed between the motor shaft 701*a* and the output shaft 702, where the transmission assembly 700*a* may be any suitable transmission mechanism such as gear transmission and belt transmission, which is not limited herein. In this example, as shown in FIG. 4A, the drive mechanism 700 adopts a two-stage gear transmission, and the transmission assembly 700*a* includes a first gear 703 installed on the output shaft 702 and a second gear 704 installed on the motor shaft 701*a* and engaged with the first gear 703. In an example, the first gear 703 is a face gear and the second gear 704 is a cylindrical gear. Optionally, the first gear 703 and the second gear 704 may also be hypoid gears or crossed helical gears. In this example, a radius of the first gear 703 is about 15 mm, which means that the radius within a certain allowable error range belongs to the disclosure of this example.

In this example, a center of a stator lamination 7011 of the motor 701 is defined as a center of the motor, and a distance between the center of the motor and the second axis 706 is L2,where a ratio of L2 to a length of the base plate is less than or equal to ½. Preferably, the ratio of L2 to the length of the base plate is approximately equal to ⅓. Regarding the length of the base plate, lengths of base plates with different shapes are defined differently. For example, the length of a circular base plate is a diameter of a circle, the length of a rectangular base plate is a length of the longest side of a rectangle, and the length of a base plate of a triangular sander is a length of a median from a base of a triangle.

It is to be understood that a distance between an outer surface of the stator lamination 7011 and the motor shaft 701*a* is a radius of the motor 701. In this example, a ratio of a diameter of the motor to a height of the sanding tool is greater than or equal to 0.2 and less than or equal to 0.6, for example, may be 0.3, 0.4, or 0.5, which prevents a relatively large dimension of the motor from affecting the compactness of the entire machine.

In this example, a ratio of an axial height of the entire machine to the length of the base plate is greater than or equal to 0.5 and less than or equal to 1, for example, may be 0.5, 0.6, 0.8, or 0.9, which reduces the dimension of the entire machine.

In this example, a ratio of rated power of the motor 701 to the axial height H of the entire machine is less than or equal to 2.5 w/mm. For example, the ratio of the rated power of the motor 701 to the axial height of the entire machine is 2.3 w/mm, 2.2 w/mm, 2.0 w/mm, 1.8 w/mm, 1.5 w/mm, 1.3 w/mm, or 1.0 w/mm. A ratio of a rated voltage of the battery pack 600 to the axial height H of the entire machine is less than or equal to 0.3 v/mm. For example, the ratio of the rated voltage of the battery pack 600 to the axial height of the entire machine is 0.2 v/mm or 0.1 v/mm. That is, when a relatively high output power of the tool is ensured or the tool adopts a battery pack with a relatively high rated voltage, the height of the sanding tool can be reduced to 120 mm or less, for example, 110 mm or less. For example, when the rated power of the motor is 250 W and the rated voltage of the battery pack is 18 V, the height of the sanding tool is reduced to 120 mm or less, for example, 110 mm or less.

The preceding reasonable layout prevents an increase of the height of the entire machine and improves the compactness of the entire machine while ensuring that the motor has relatively great energy efficiency.

Figure 3A:
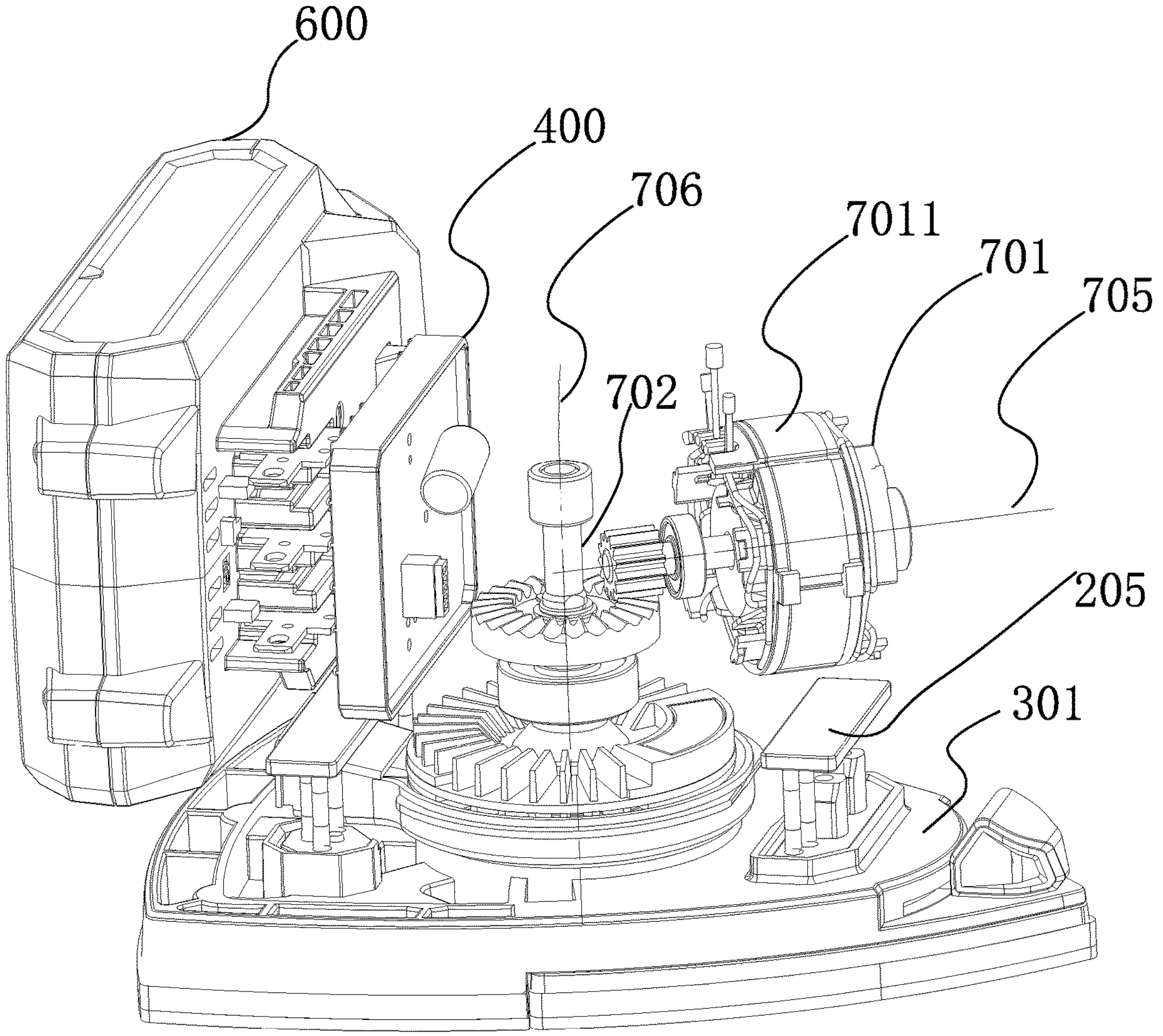
FIGS. 3A, 4A, and 5A are structure views of the sanding tool of FIG. 1 with a casing removed.

In this example, as shown in FIG. 3A, the first axis 705 and the second axis 706 form an included angle. That is, the motor shaft 701*a* is not parallel to the output shaft 702. For example, the motor 701 may be perpendicular to the output shaft 702 or may be disposed obliquely above the output shaft 702 or in front of or to the left or right of the output shaft 702 or at another position that can accommodate the motor 701 in the casing 201.

Figure 4B:
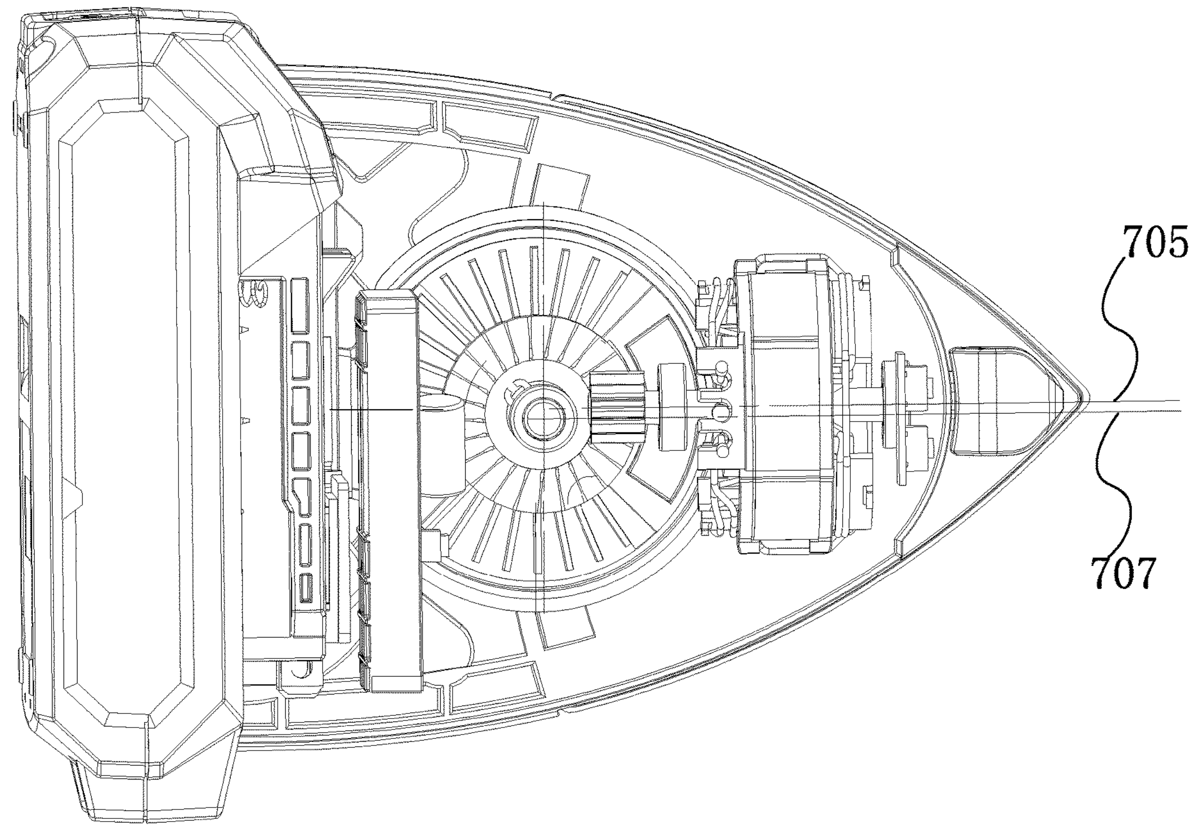
Figure 5A:
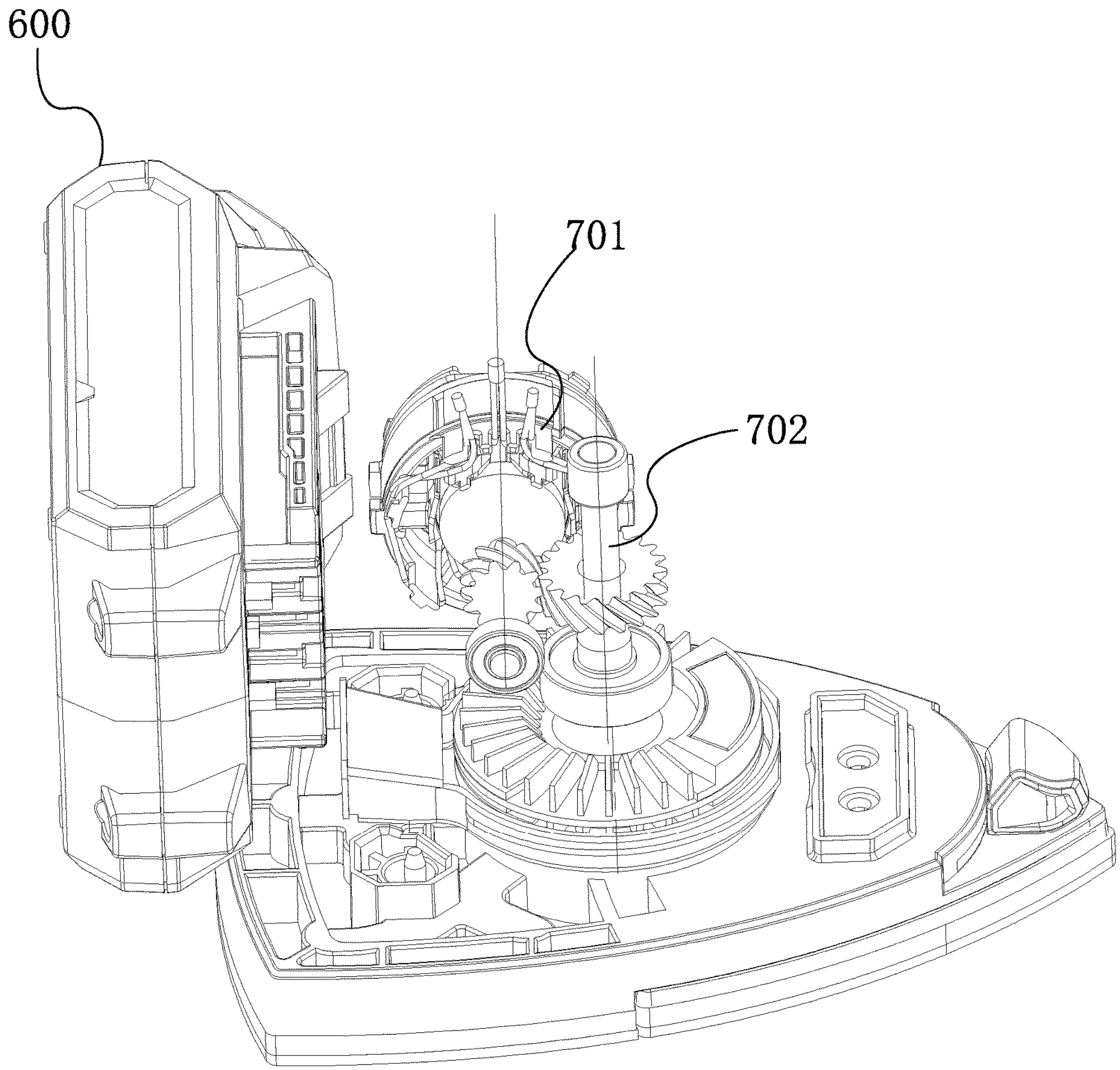
Figure 5B:
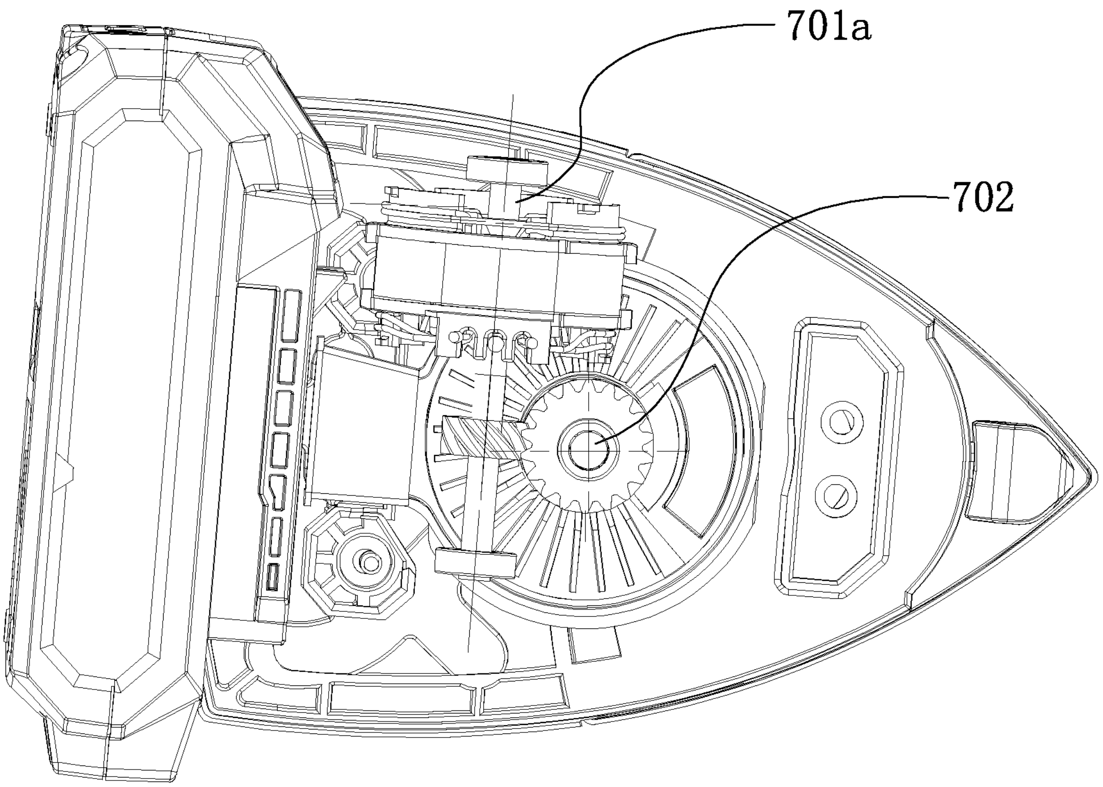

In this example, the first axis 705 is perpendicular to the second axis 706 or the first axis 705 is parallel to a plane where the base plate 301 is located, that is, the motor 701 is disposed transversely in any plane parallel to the plane where the base plate 301 is located. In a preferred implementation, as shown in FIGS. 3A and 4B, the motor 701 is disposed transversely in a cavity formed by the casing at a front end of the base plate 301, where the front end refers to an end of the base plate 301 opposite to the battery pack. Therefore, while the height of the entire machine is reduced, a weight of the battery pack is balanced such that a center of gravity of the entire machine is close to the output shaft and the entire machine has a relatively good balance, thereby reducing the vibration of the tool in use.

Figure 3B:
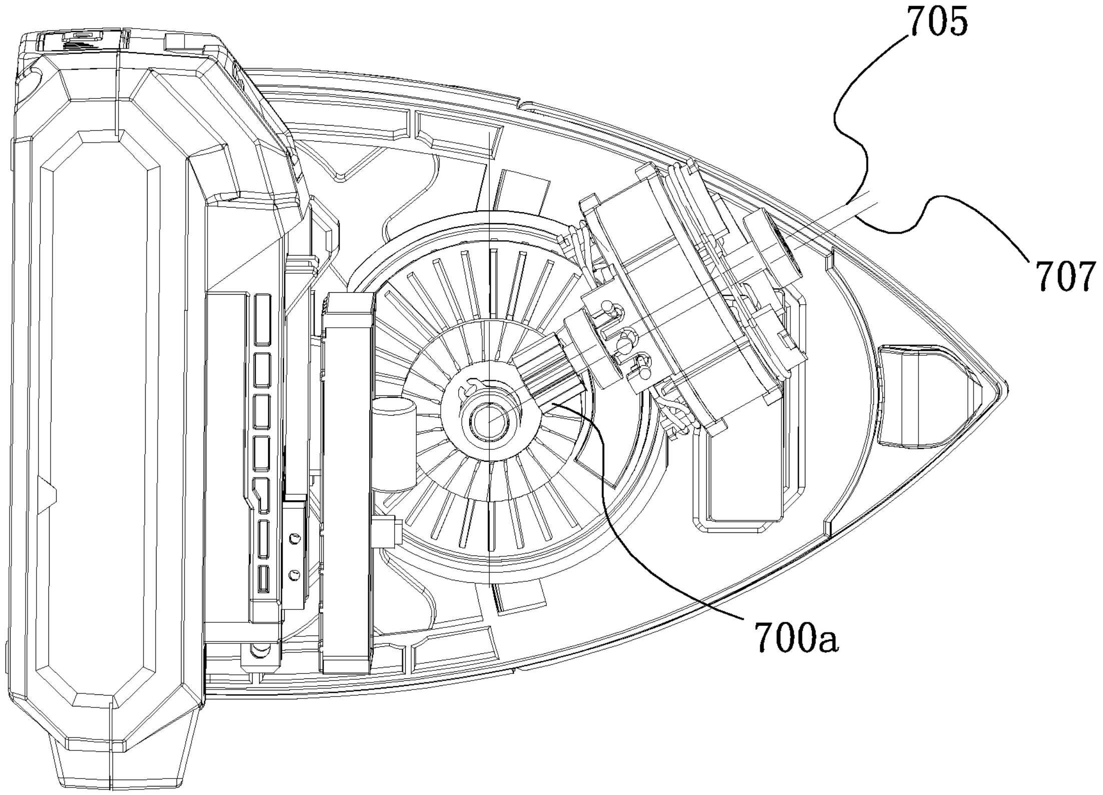
FIGS. 3B, 4B, and 5B are top views corresponding to the sanding tools of FIGS. 3A, 4A, and 5A with a casing removed, respectively.

In this example, as shown in FIGS. 3A and 4A, the first axis 705 and the second axis 706 are not in the same plane, that is, the motor shaft 701*a* and the output shaft 702 are staggered. For example, a first axis in the same plane as the second axis 706, as shown in FIGS. 3B and 4B, is defined as a reference axis 707, and then a distance between the first axis 705 and the reference axis 707 when the motor shaft 701*a* and the output shaft 702 are staggered is a stagger distance L1 between the first axis 705 and the second axis 706. In the examples of the present disclosure, the stagger distance L1 is less than or equal to the radius of the first gear. Preferably, the stagger distance between the first axis and the second axis is 1 mm.

Figure 11:
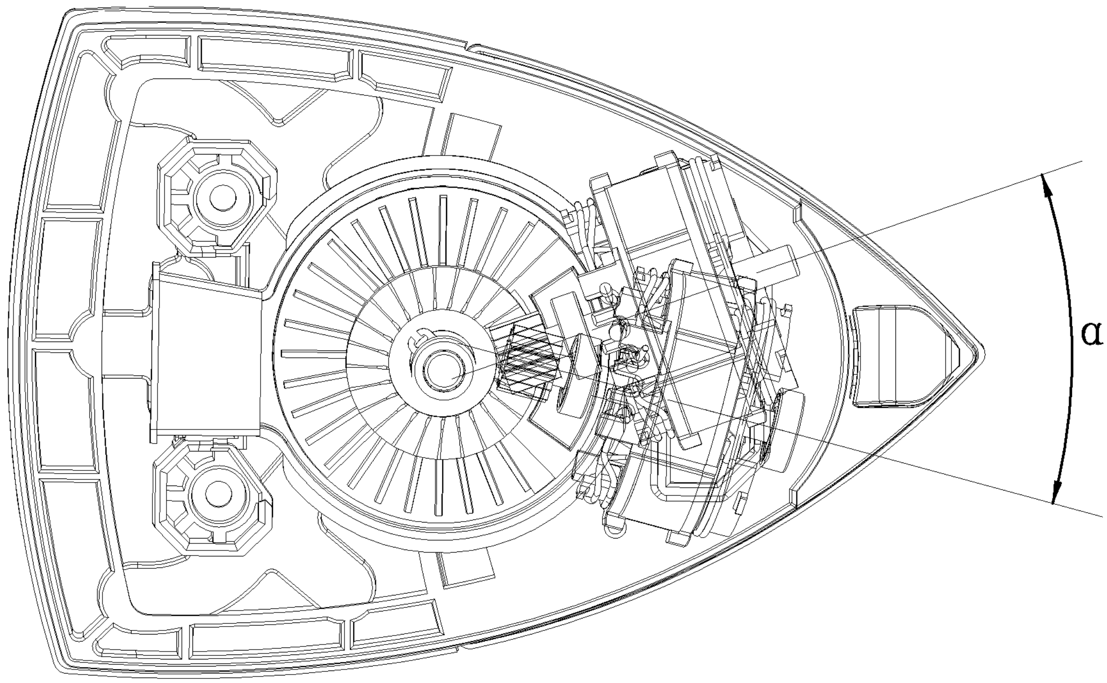
FIG. 11 is a schematic view of an included angle between two extreme installation positions of a motor.

In this example, a projection of the motor 701 on the plane where the base plate 301 is located is within the base plate 301. The motor 701 includes a first extreme installation position and a second extreme installation position. It is to be understood that a center position of the motor 701 is between the first extreme installation position and the second extreme installation position. As shown in FIG. 11, the first extreme installation position rotates in a plane parallel to the base plate 301 by an included angle $\alpha$ with the second axis 706 of the output shaft 702 as a center to reach the second extreme installation position. The included angle $\alpha$ is greater than or equal to 0° and less than or equal to 30°. For example, the included angle α is 30°, 25°, 20°, or 10°.

In this example, the first extreme installation position and the second extreme installation position are symmetrical about the center plane 209. That is, the first extreme installation position and the second extreme installation position are disposed on two sides of the center plane 209, respectively and when the motor 701 is disposed at the first extreme installation position or the second extreme installation position, an included angle between the motor shaft 701*a* and the center plane 209 is greater than or equal to 0° and less than or equal to 15°.

Through the preceding reasonable layout and design, a motor axis and an output axis form an included angle, which reduces the height of the sander; the motor axis and the output axis are staggered so that the motor can be adaptively positioned in a space in the casing, and the compactness of the entire machine can be further improved.

The sanding tool 100 in the examples of the present disclosure further includes a membrane switch 800 and the control mechanism 400. The control mechanism 400 is configured to control the motor to rotate. The control mechanism 400 includes a printed circuit board assembly (PCBA) on which related elements such as capacitors and inductors are disposed. The control mechanism 400 is connected to the membrane switch 800 and the power supply 600. The user can control the motor to be turned on or off by operating the membrane switch 800, where the membrane switch 800 is disposed on the casing 201. In this example, the membrane switch 800 may be disposed at a front end of the holding portion 203. Of course, the membrane switch may not necessarily be disposed at the front end of the holding portion 203 and may be disposed at any position of the machine body. The traditional mechanical switch is replaced with the membrane switch 800 so that the tool is powered on/off with less efforts and more convenience, improving the user experience.

Figure 6:
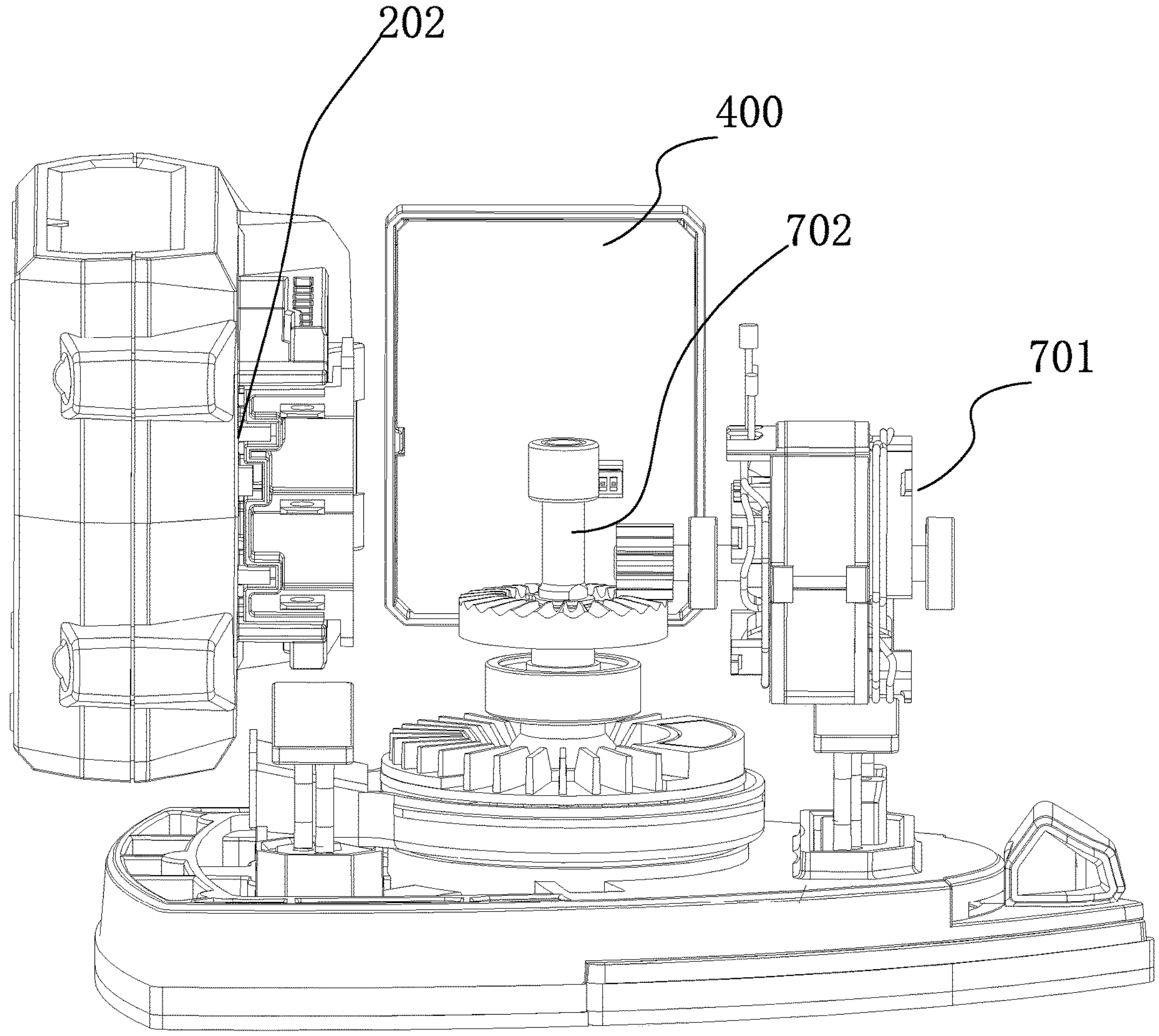
FIG. 6 is another structure view of the sanding tool of FIG. 1 with a casing removed.
Figure 12:
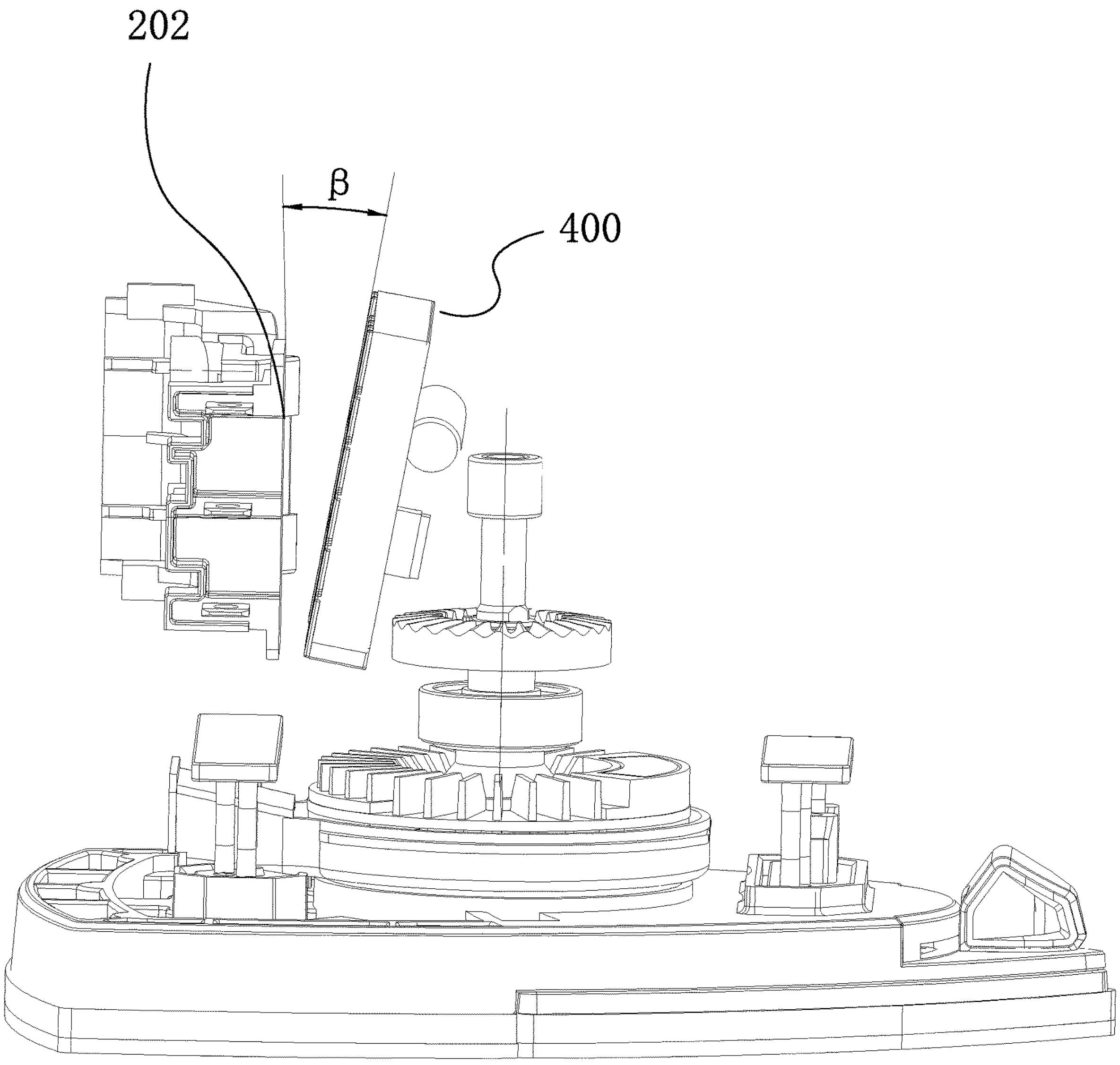
FIG. 12 is a schematic view of an included angle between a control mechanism and a plane where a coupling portion of a machine body is located.

In this example, the control mechanism 400 is disposed vertically (that is, perpendicular to the plane where the base plate is located) or obliquely in the casing 201. Referring to FIG. 3A, the control mechanism 400 is substantially parallel to a coupling portion 202 of the machine body. Alternatively, as shown in FIG. 6, the control mechanism 400 is substantially perpendicular to the coupling portion 202. Optionally, the control mechanism 400 may be disposed transversely in the holding portion 203. In this example, the control mechanism 400 is the PCBA which is parallel to the coupling portion 202 of the machine body, and a distance between the assembly and the second axis 706 is greater than the radius of the first gear 703. In this example, as shown in FIG. 12, an included angle β between the PCBA 400 and a plane where the coupling portion 202 is located satisfies that $0° \leq \beta \leq 30°$ and may be, for example, 30°, 25°, 20°, 15°, or 10°.

Figure 9:
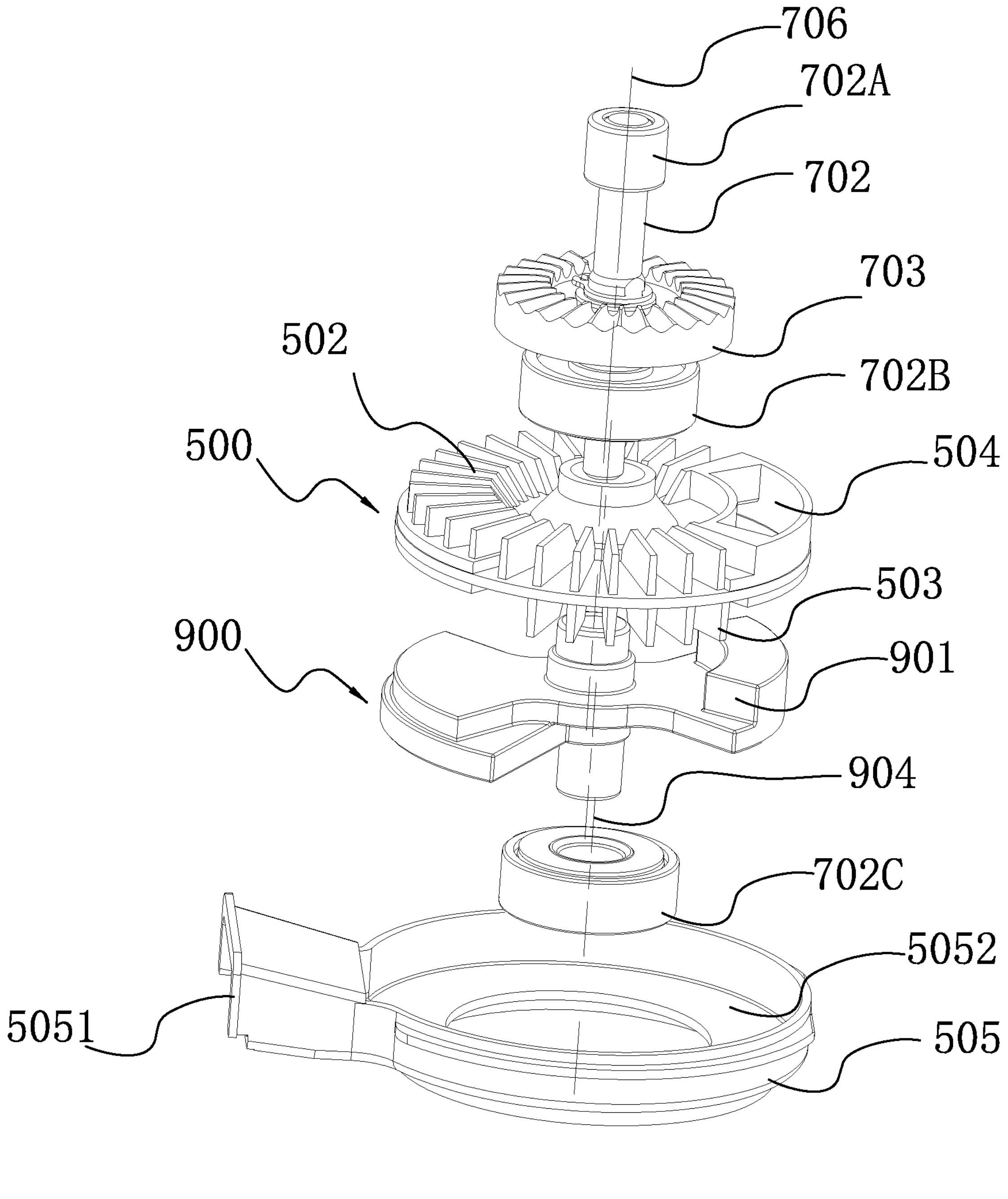
FIG. 9 is a schematic view of part of an internal structure of the sanding tool of FIG. 1.
Figure 10:
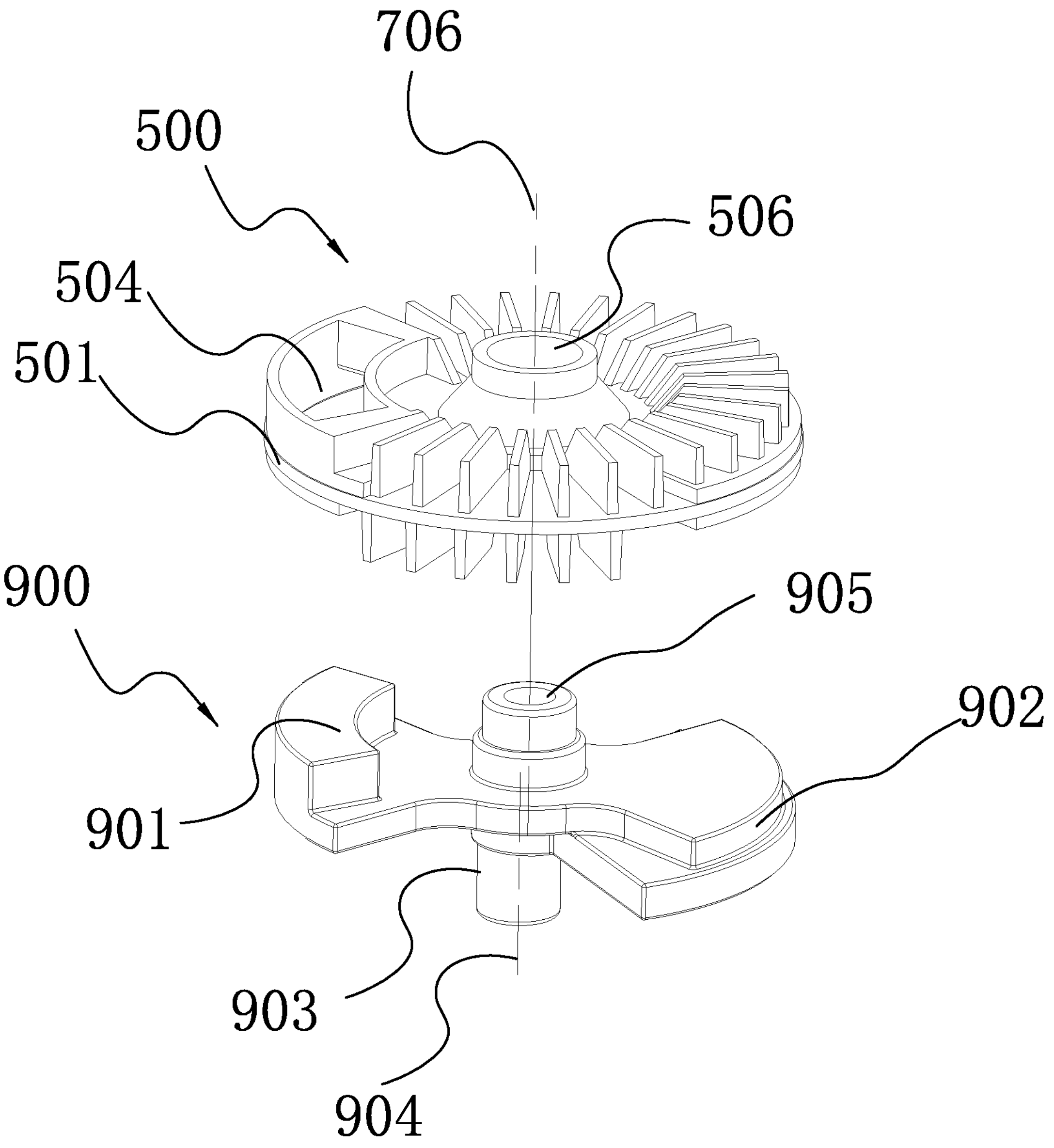
FIG. 10 is a schematic view of part of an internal structure of the sanding tool of FIG. 1.

As shown in FIG. 9, the sanding tool 100 in this example further includes the fan assembly 500 and a counterweight assembly 900. As shown in FIGS. 9 and 10, the fan assembly 500 is sleeved on the output shaft 702 through a first axle hole 506 in the middle. The fan assembly 500 includes a blade installation plate 501, and cooling fan blades 502 are disposed above the blade installation plate 501 and configured to form a cooling air path. Dust collection fan blades 503 are disposed below the blade installation plate 501 and configured to form a dust collection air path. The cooling fan blades 502 are disposed evenly on an upper side of the blade installation plate 501 in a circumferential direction of the blade installation plate 501; and the dust collection fan blades 503 are disposed evenly on a lower side of the blade installation plate 501 in the circumferential direction of the blade installation plate 501.

The counterweight assembly 900 is disposed below the fan assembly 500 and specifically includes a counterweight 901, a counterweight plate surface 902, and an eccentric shaft 903. The counterweight plate surface 902 is sleeved on the eccentric shaft 903 through a second axle hole 905 in the middle. The counterweight 901 is disposed on an upper side of the counterweight assembly 900 and a bump on the counterweight plate surface 902. Correspondingly, the blade installation plate 501 of the fan assembly 500 is provided with a fan through hole 504 fitting with the counterweight 901 in shape so that the counterweight 902 is engaged with the fan assembly 500 through the fan through hole 504. The fan through hole 504 is a special-shaped through hole and has the same shape as the counterweight 901.

In this example, the fan is in transition fit with the eccentric shaft 903. The eccentric shaft 903 is in interference fit with the output shaft 702, and the output shaft 702 may drive the eccentric shaft 903 to rotate. Alternatively, the eccentric shaft 903 may be in transition fit and a flat fit with the output shaft 702. In this example, the fan assembly 500 is a plastic assembly and the counterweight assembly 900 is a metal assembly.

In an alternative implementation, the fan assembly 500 and the counterweight assembly 900 may be an integral metal assembly which has the functions of both the counterweight assembly and the fan assembly. The metal assembly with such functions is a mature mechanical assembly and is not repeated herein.

As shown in FIG. 9, the sanding tool 100 further includes a wind deflector 505. The wind deflector 505 is provided with a dust outlet 5051 of the wind deflector that is docked with a dust outlet 204 of the casing, and the wind deflector 505 is recessed inwards so that an accommodation portion 5052 is formed for accommodating the counterweight assembly 900 and the dust collection fan blades 503. The fan assembly 500 is connected to the drive mechanism and driven by the motor 701 to rotate. After the dust collection fan blades 503 rotate, a negative pressure is formed in the accommodation portion 506 of the wind deflector 505 so that dust generated during the sanding of the base plate assembly 300 is sucked and enters a dust collection device connected to the dust outlet 204 through the dust outlet 5051 under the drive of a rotating airflow generated by the rotation of the dust collection fan blades 503. The dust collection device may be an independent dust collection box and other similar devices.

As shown in FIG. 2, in this example, the dust outlet 204 of the casing is disposed at a rear end of the casing 201 and on a lower side of the coupling portion 202. In another alternative example, as shown in FIG. 7, the dust outlet 204 of the casing may be disposed on a left and/or right side of the casing 201.

Figure 14:
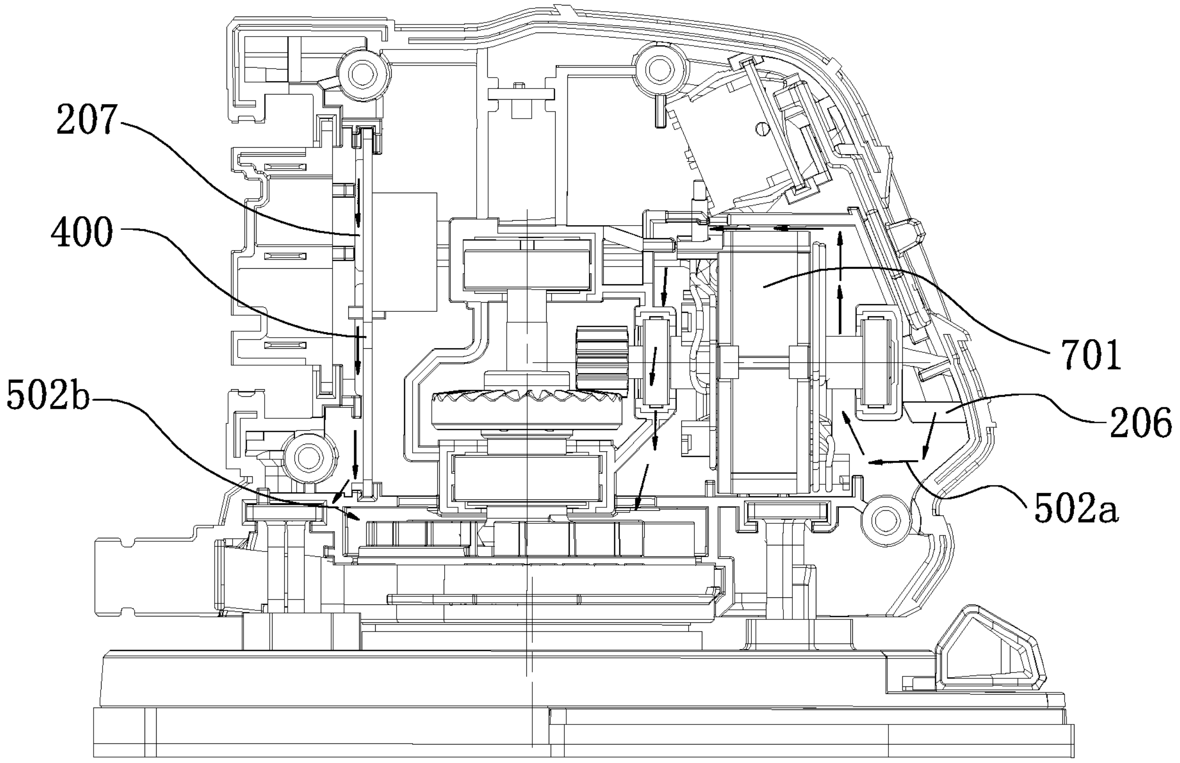
FIG. 14 is a schematic view of a cooling air path in a sanding tool.

In this example, the cooling air path includes a first cooling air path 502*a* and a second cooling air path 502*b*. As shown in FIG. 14, arrows in the figure indicate a direction of the cooling air path. The first cooling air path 502*a* passes through the motor 701 to dissipate heat for the motor 701; and the second cooling air path 502*b* passes through the control mechanism 400 to dissipate heat for the control mechanism 400. The first cooling 502*a* air path and the second cooling air path 502*b* intersect at the cooling fan blades 502. That is, the two cooling air paths are independent of each other and do not affect each other.

As shown in FIG. 2, the two cooling air paths at least include two air inlets and one air outlet disposed on the casing 201. An air outlet 208 is disposed on the casing 201 in correspondence to the cooling fan blades 502; a first air inlet 206 is disposed in correspondence to the motor 701 or disposed upstream of the motor 701 along the first cooling air path 502*a;* and a second air inlet 207 is disposed in correspondence to the control mechanism 400 or disposed upstream of the control mechanism 400 along the second cooling air path 502*b*. In this example, the first air inlet 206 is disposed on a front side of the casing 201 and the second air inlet 207 is disposed on a rear side of the casing 201. In this example, after basic positions of the two air inlets are determined, the shape or dimension of each air inlet can be adjusted according to specific design requirements, which is not limited herein.

Two independent cooling air paths are provided to dissipate heat for the control mechanism and the motor, respectively, thereby increasing the heat dissipation area of the control mechanism and the motor and improving the heat dissipation effect of the tool.

In this example, the power supply of the tool is the battery pack. As shown in FIG. 2, the battery pack 600 includes a coupling surface 601. The coupling surface 601 of the battery pack 600 is connected to the coupling portion 202 of the machine body 200. The coupling surface 601 refers to a plane where a connection terminal on the battery pack 600 is located and may be a real plane or an imaginary plane. It is to be noted that the battery pack 600 has the longest dimension in a direction along which the battery pack 600 is plugged in and out.

The direction along which the battery pack 600 is plugged in and out may be parallel to the plane where the base plate 301 is located. The direction along which the battery pack is plugged in and out is parallel to the plane where the base plate is located, where the battery pack 600 is plugged in and out in a left-and-right direction or in a front-and-rear direction. When the battery pack 600 is plugged in and out in the left-and-right direction, the coupling surface is perpendicular to the base plate 301 or the coupling surface is inclined relative to the base plate 301.

In this example, the battery pack is plugged in and out from a main machine in the left-and-right direction in FIG. 3A, the coupling surface 601 of the battery pack 600 is substantially perpendicular to the base plate 301, and the battery pack 600 is coupled to the coupling portion 202 of the machine body 200. In this example, a distance between the coupling surface 601 of the battery pack 600 and the output shaft 702 is less than ½ of the length of the base plate. In this example, the length of the base plate is a length of a median from a base of a triangular base plate.

As an alternative example, the direction along which the battery pack 600 is plugged in and out may be perpendicular to the base plate 301, that is, the battery pack is plugged in and out from the machine body in an up-and-down direction in FIG. 3A, or the direction along which the battery pack is plugged in and out may be inclined relative to the base plate.

Of course, to obtain a smaller height of the entire machine, as an alternative example, the battery pack may be plugged in and out in the left-and-right direction and the coupling surface 601 is inclined relative to the base plate 301. At this time, the coupling surface 601 may be inclined towards the front end in FIG. 3A or inclined towards the rear end in FIG. 3A. Further, the direction along which the battery pack 600 is plugged in and out may be parallel to the base plate 301 and the coupling surface 601 is parallel to the base plate 301, that is, the battery pack is plugged in and out from the entire machine in the front-and-rear direction.

Figure 13:
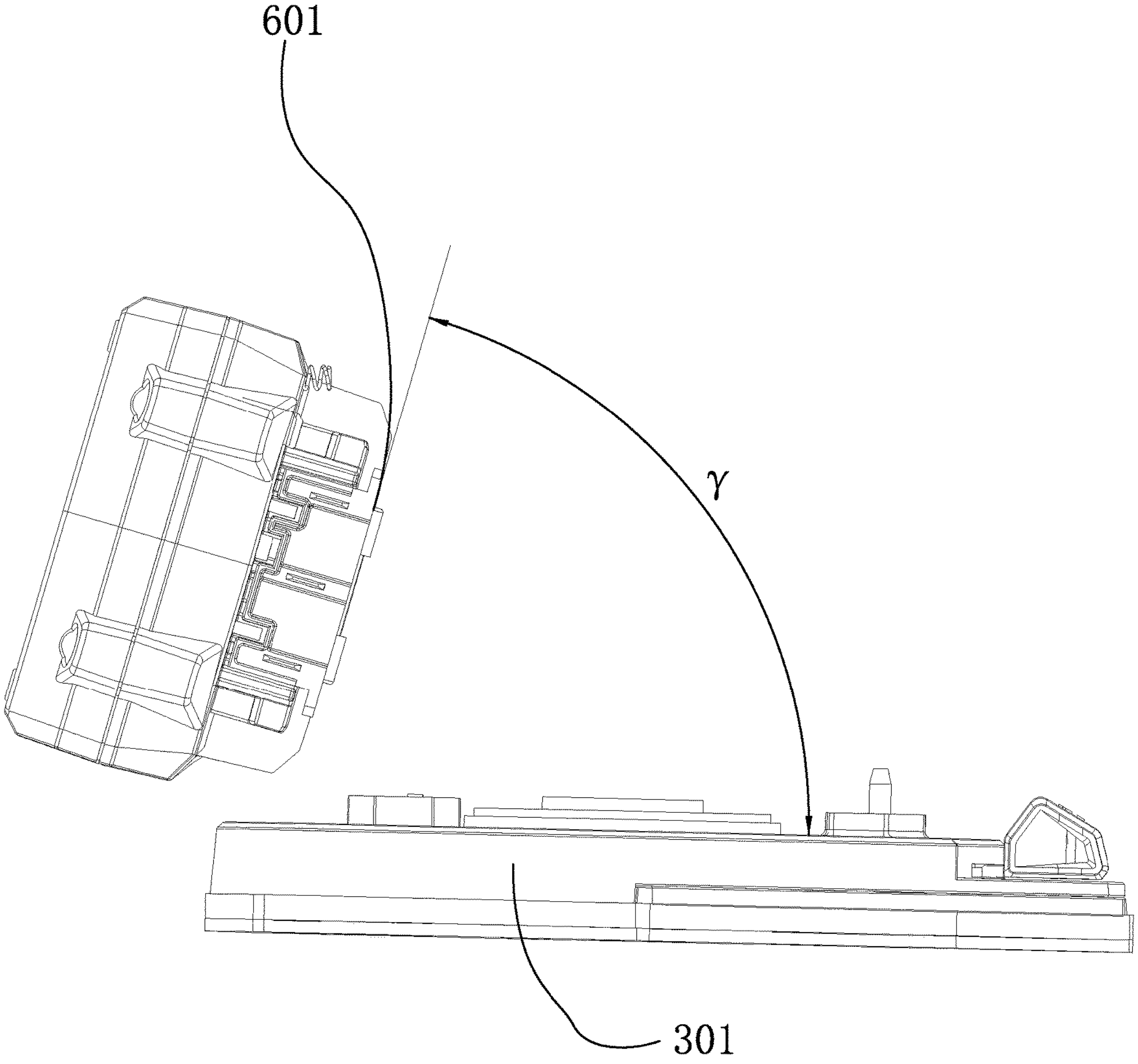
FIG. 13 is a schematic view of an included angle between a coupling surface of a battery pack and a plane where a base plate is located.

As an alternative example, as shown in FIG. 13, an included angle γ between the coupling surface 601 of the battery pack 600 and the plane where the base plate 301 is located satisfies that 0°≤γ≤120°. Preferably, the included angle γ satisfies that 45°≤γ≤120° and may be, for example, 45°, 60°, 90°, 100°, or 120°.

As an alternative example, the first axis 705 passes through the battery pack 600. That is, regardless of the included angle γ between the coupling surface 601 of the battery pack 600 and the base plate 301, projections of the motor 701 and the battery pack 600 on a projection plane perpendicular to the base plate 301 overlap, where the projection plane refers to a plane extending in the left-and-right direction and being perpendicular to the base plate 301.

In this example, a ratio of a height of the battery pack 600 on the projection plane to the height of the tool is less than or equal to 0.7, for example, 0.68, 0.65, 0.63, or 0.6.

A projection of the battery pack 600 on the plane where the base plate 301 is located overlaps with the base plate 301. That is, the projection of the battery pack 600 on the plane where the base plate 301 is located completely falls within the base plate 301 or partially falls within the base plate 301. In this example, a part of the battery pack whose projection does not fall within the base plate 301 has a length of about 0 to 10 mm, that is, it is also within the scope of the present application that the length of the part of the battery pack whose projection does not fall within the base plate 301 is about 10 mm.

Figure 15:
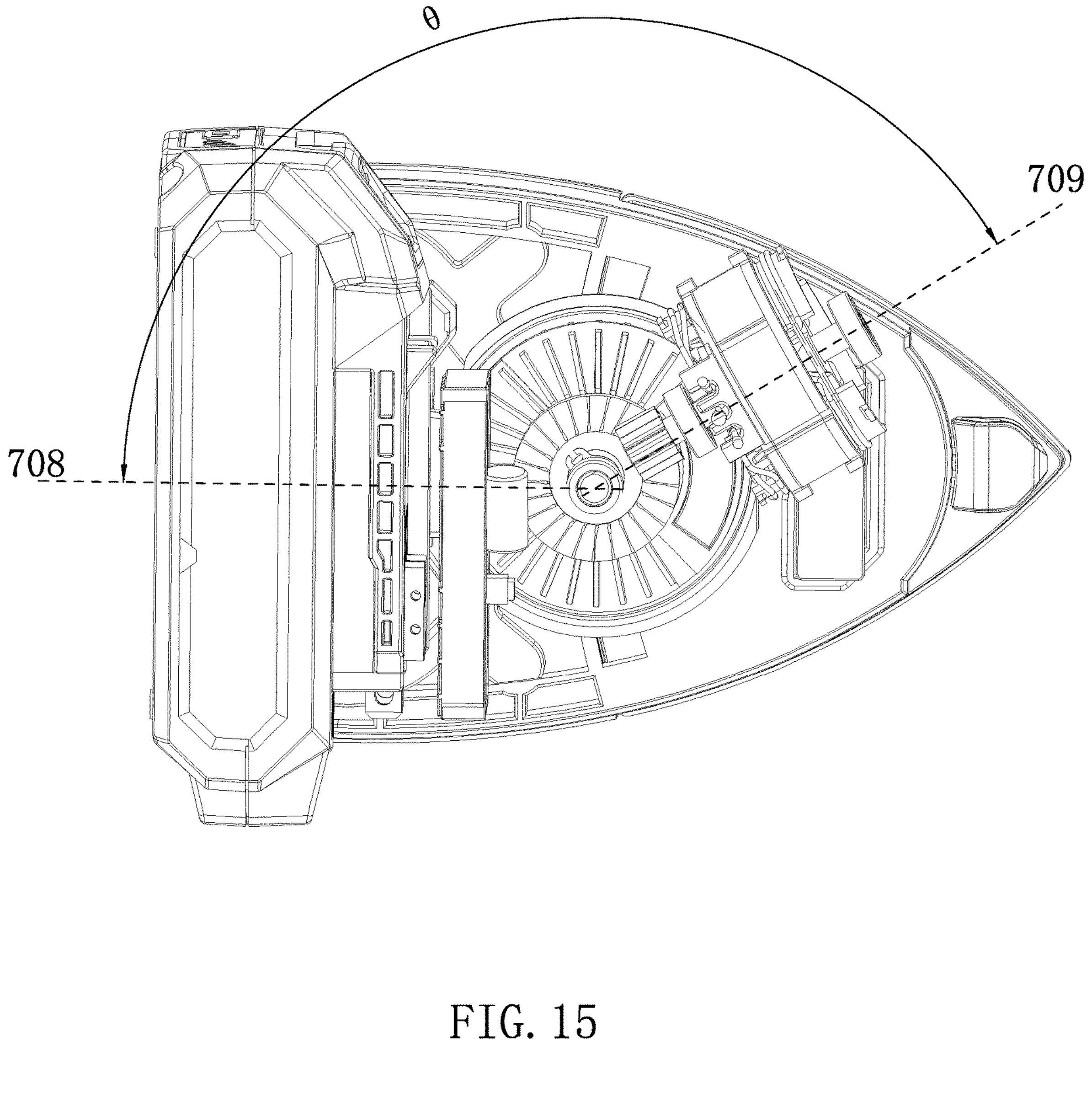
FIG. 15 is a schematic view of an included angle with a battery pack and a motor on two sides of an output shaft in a sanding tool.

The battery pack 600 and the motor 701 are disposed on two sides of the output shaft, respectively. The battery pack 600 is disposed on a first radial line 708 with the second axis 706 as the center, and the motor 701 is disposed on a second radial line 709 with the second axis 706 as the center, where the first radial line 708 and the second radial line 709 are each parallel to the base plate 301 and both extend radially from the second axis 706. Being disposed on two sides means that an included angle θ between projections of the first radial line 708 and the second radial line 709 shown in FIG. 15 on the base plate satisfies that 80°≤θ≤180 ° without affecting the length and/or height of the entire machine and may be, for example, 80°, 90°, 120°, 150°, or 180°.

In this example, the battery pack 600 and the motor 701 are disposed on front and rear sides of the output shaft 702, respectively and the projections of the motor 701 and the battery pack 600 on the projection plane perpendicular to the base plate 301 overlap, where the projection plane refers to the plane extending in the left-and-right direction and being perpendicular to the base plate 301. That is, the projection of the motor 701 on the projection plane completely or partially falls within the projection of the battery pack 600 on the projection plane.

In examples of the present application, when a battery pack with a rated voltage of 18V to 24V or higher is configured in the tool, the height of the entire machine is less than or equal to 120 mm, for example, less than or equal to 110 mm.

Through the preceding reasonable layout and design, the battery pack and the motor are disposed transversely on two sides of the output shaft, respectively, and the battery pack is configured to be plugged in and out in different directions and at different angles, so as to ensure that the battery pack is disposed without increasing the height or length of the entire machine; a direction in which the motor is disposed transversely relative to the plane of the base plate or an angle at which the motor is inclined relative to the plane of the base plate is set, thereby reducing the effect of the motor on the height and length of the entire machine. In this manner, the compactness of the entire machine is ensured.

It is to be understood that in the preceding examples, the entire machine is provided with the dust outlet to which an external dust collection box is connected. After the dust collection box is installed on the entire machine, the main machine has a bulky structure and a relatively large volume, and the dust collection device is inconvenient to clean or fails to be thoroughly cleaned. Therefore, while satisfying the compactness, the sander also needs to satisfy the requirements for convenient dust collection, convenient cleaning, and miniaturization of the entire machine.

To solve the preceding problems, the structure of the casing is further optimized in the present application.

Figure 16:
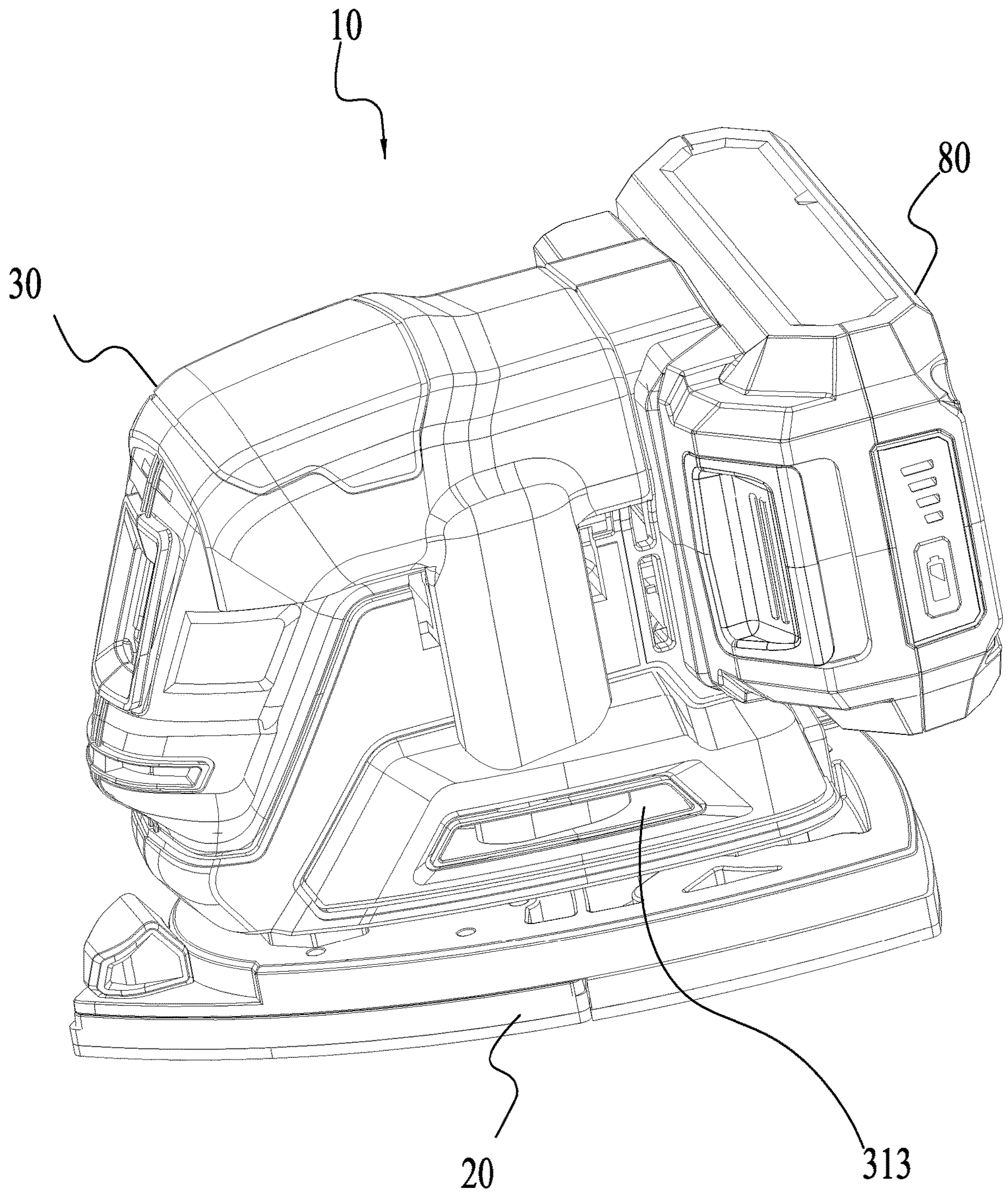
FIG. 16 is a structure view of a sanding tool according to an example.
Figure 17:
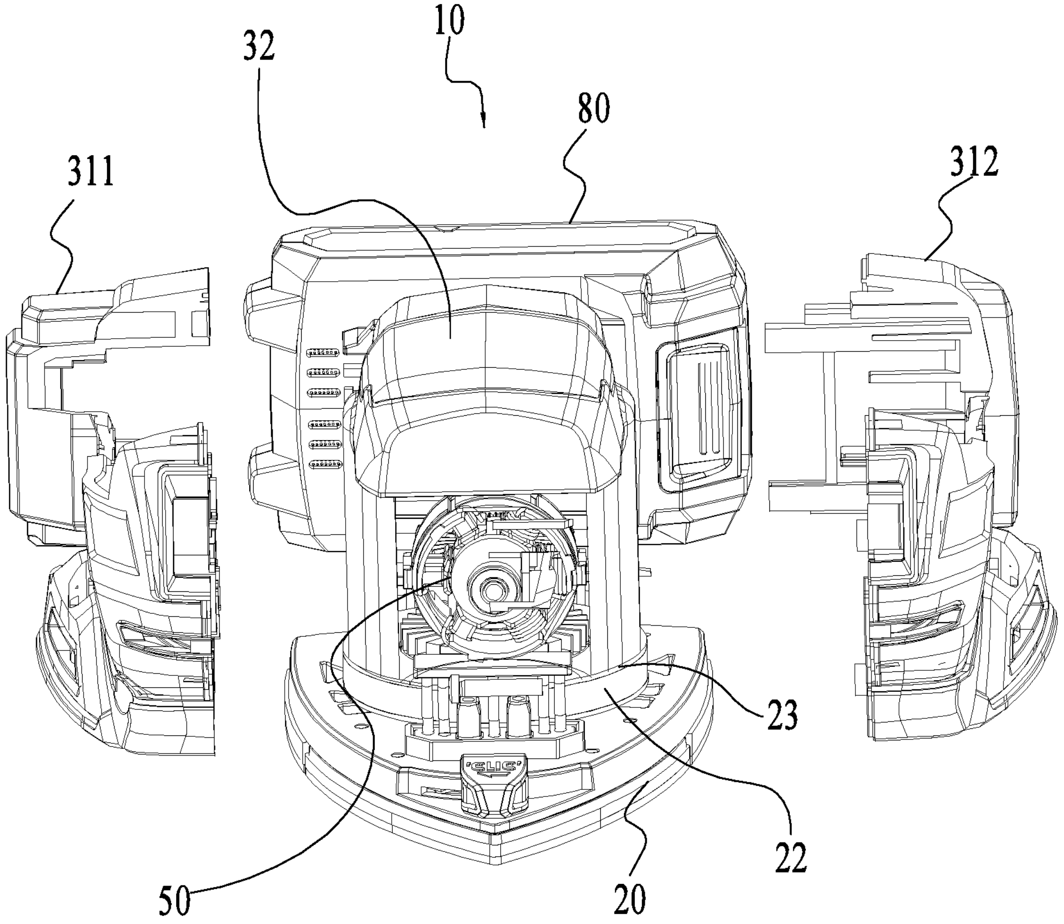
FIG. 17 is a schematic view illustrating the assembly of a body casing of the sanding tool of FIG. 16.

In an example, as shown in FIG. 16, a sanding tool 10 includes a base plate assembly 20, a casing 30, a fan assembly 40, a drive mechanism 50, and a power supply. As shown in FIG. 17, the casing 30 includes a body casing 31 and a functional casing 32, and the drive mechanism 50 and the fan assembly 40 are both disposed in the casing 30. The power supply may be a DC power supply such as a battery pack 80 or may be an AC power supply. In the present application, the DC power supply is used as an example for description.

Referring to FIGS. 16 to 21 and FIG. 25, the base plate assembly 20 includes a base plate 21 and a sanding piece fixed on the base plate 21. A flat surface is formed on the base plate 21, and the sanding piece is disposed on a side of the base plate 21 facing away from a casing assembly. The sanding piece may be sandpaper or other types of abrasive or polishing parts and may be removably attached to the base plate 21 in a conventional manner such as hook and loop connectors and/or clamp retainers. The base plate 21 is provided with a base plate dust suction port configured to suck dust generated during an operation.

The drive mechanism 50 is configured to drive the base plate assembly 20 to move and the fan assembly 40 to rotate. The drive mechanism 50 includes a motor 51 and an output shaft 52 connected to the motor 51. The fan assembly 40 is installed on the output shaft 52 and driven to rotate by the output shaft 52. The fan assembly 40 includes a dust collection fan 41 and a multifunctional fan 42. The dust collection fan 41 is disposed at an upper end of the output shaft 52 and the multifunctional fan 42 is disposed at a lower end of the output shaft 52. The multifunctional fan 42 is a two-in-one fan and includes heat dissipation fan blades 421 and an eccentric block 422. The heat dissipation fan blades 421 are configured to form an air path for dissipating heat for the motor 51 when the multifunction fan 42 rotates. In the present application, an eccentric shaft 423 is connected to a bottom end of the output shaft 52. The eccentric shaft 423 is installed in the base plate assembly 20. The motor 51 drives a motor shaft 511 to rotate, thereby driving the eccentric shaft 423 to rotate and driving the base plate 21 to perform eccentric movement on a surface of a workpiece. To balance the vibration during the eccentric movement, the sanding tool in the examples of the present disclosure is further provided with the eccentric block 422, where a eccentric block 422 is disposed on the multifunctional fan 42 or may be disposed on the base plate 21.

Figure 24:
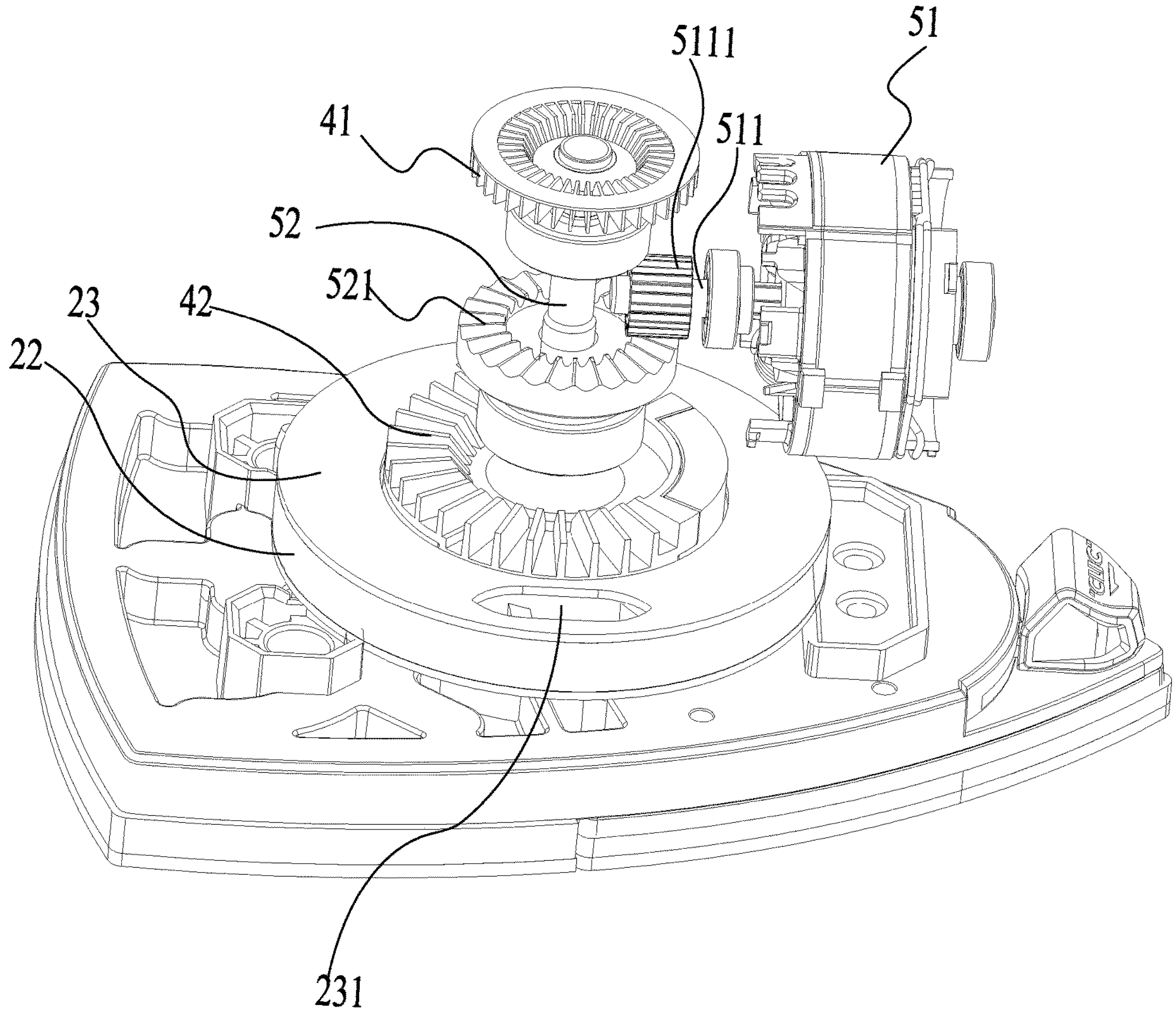
FIG. 24 is a perspective view of a portion of the sanding tool shown of FIG. 16.

In this example, as shown in FIG. 24, the drive mechanism 50 adopts a two-stage gear transmission, and a transmission assembly includes a first gear 521 installed on the output shaft 52 and a second gear 5111 installed on the motor shaft 511 and engaged with the first gear 521. The output shaft 52 is perpendicular to the plane of the base plate and configured to transmit a driving force of the motor 51 to the base plate assembly 20 to drive the base plate assembly 20 to perform sanding. In an example, the first gear 521 is a face gear and the second gear 5111 is a cylindrical gear. Optionally, the first gear 521 and the second gear 5111 may also be hypoid gears or crossed helical gears.

Figure 23:
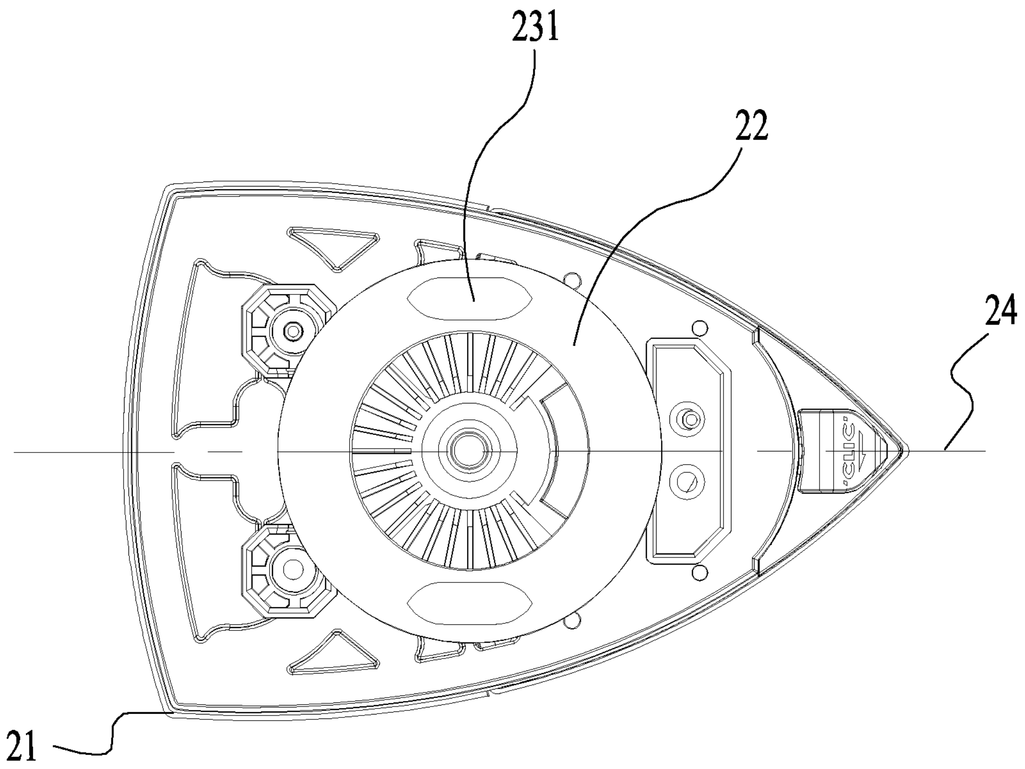
FIG. 23 is a schematic view of the base plate assembly of the sanding tool of FIG. 16.

In this example, the motor shaft 511 is parallel to the plane of the base plate and perpendicular to the output shaft 52. The dust collection fan 41 and the multifunctional fan 42 are disposed at two ends of the output shaft 52, respectively, and the face gear 521 engaged with the gear on the motor shaft 511 is disposed at a middle position of the output shaft 52. It is to be understood that as shown in FIG. 23, an axis of the motor shaft 511 may be located directly above a center line 24 of the base plate or may have a certain included angle with the center line 24 of the base plate. A size of the included angle may be adjusted freely on the premise that the overall dimension of the tool is not affected. That is, a projection of the motor 51 on the plane of the base plate does not exceed the plane of the base plate. In this manner, the case where the length of the entire machine is increased while the height of the entire machine is reduced can be avoided, thereby ensuring the compactness in structure of the entire machine.

Figure 18:
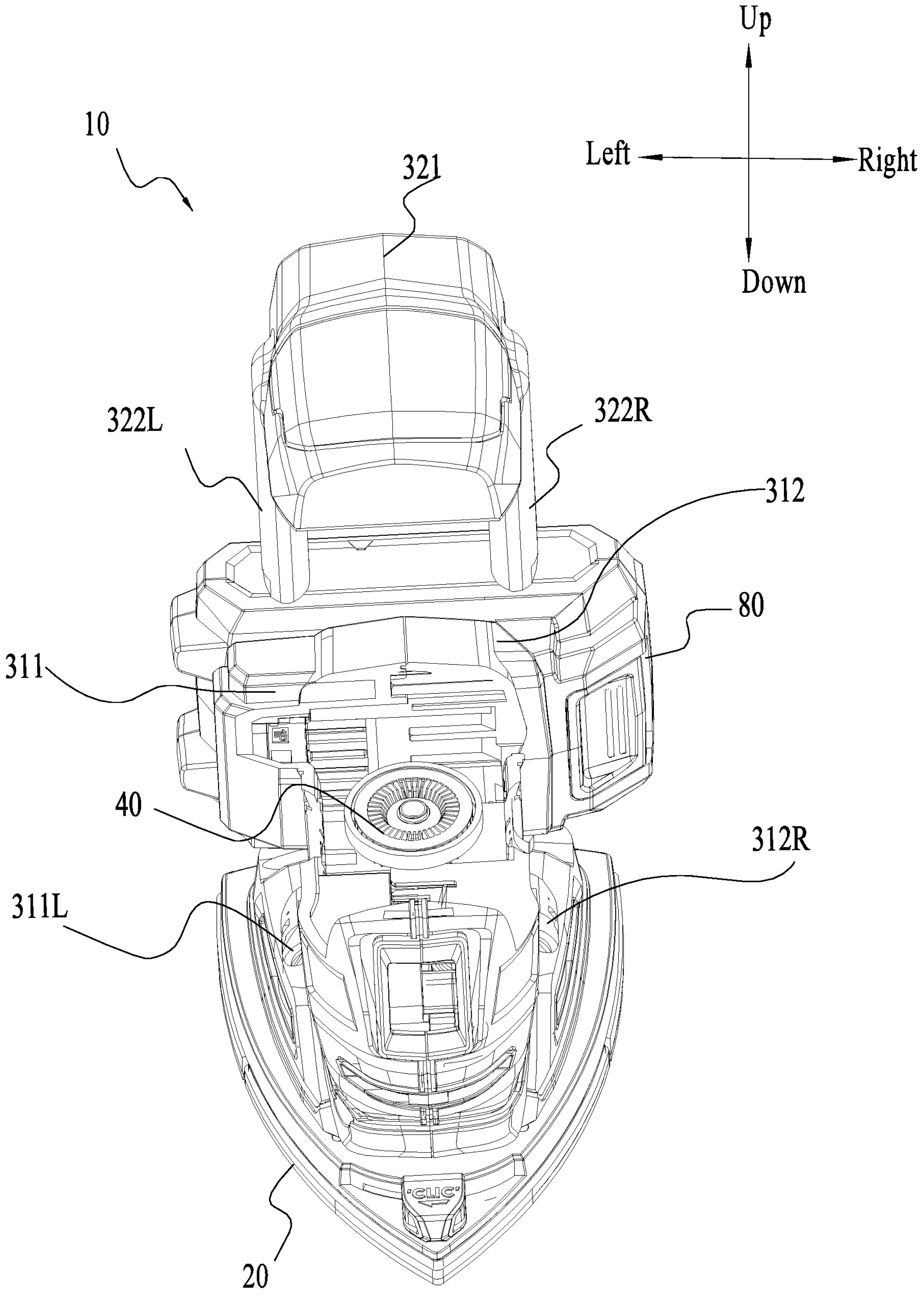
FIG. 18 is a schematic view illustrating the assembly of a functional casing of the sanding tool of FIG. 16.
Figure 19:
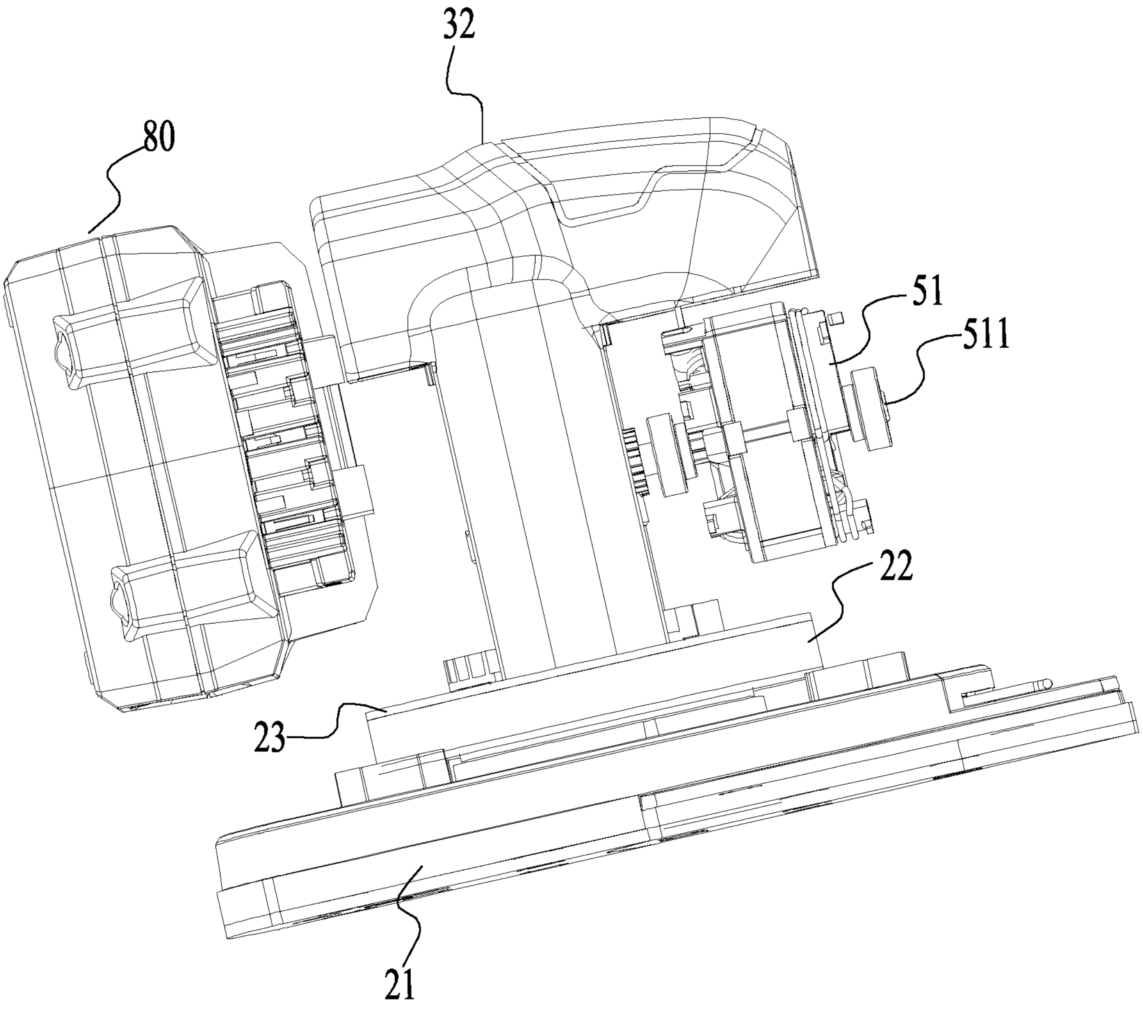
FIG. 19 is a structure view of the sanding tool of FIG. 16 with a body casing removed.
Figure 20:
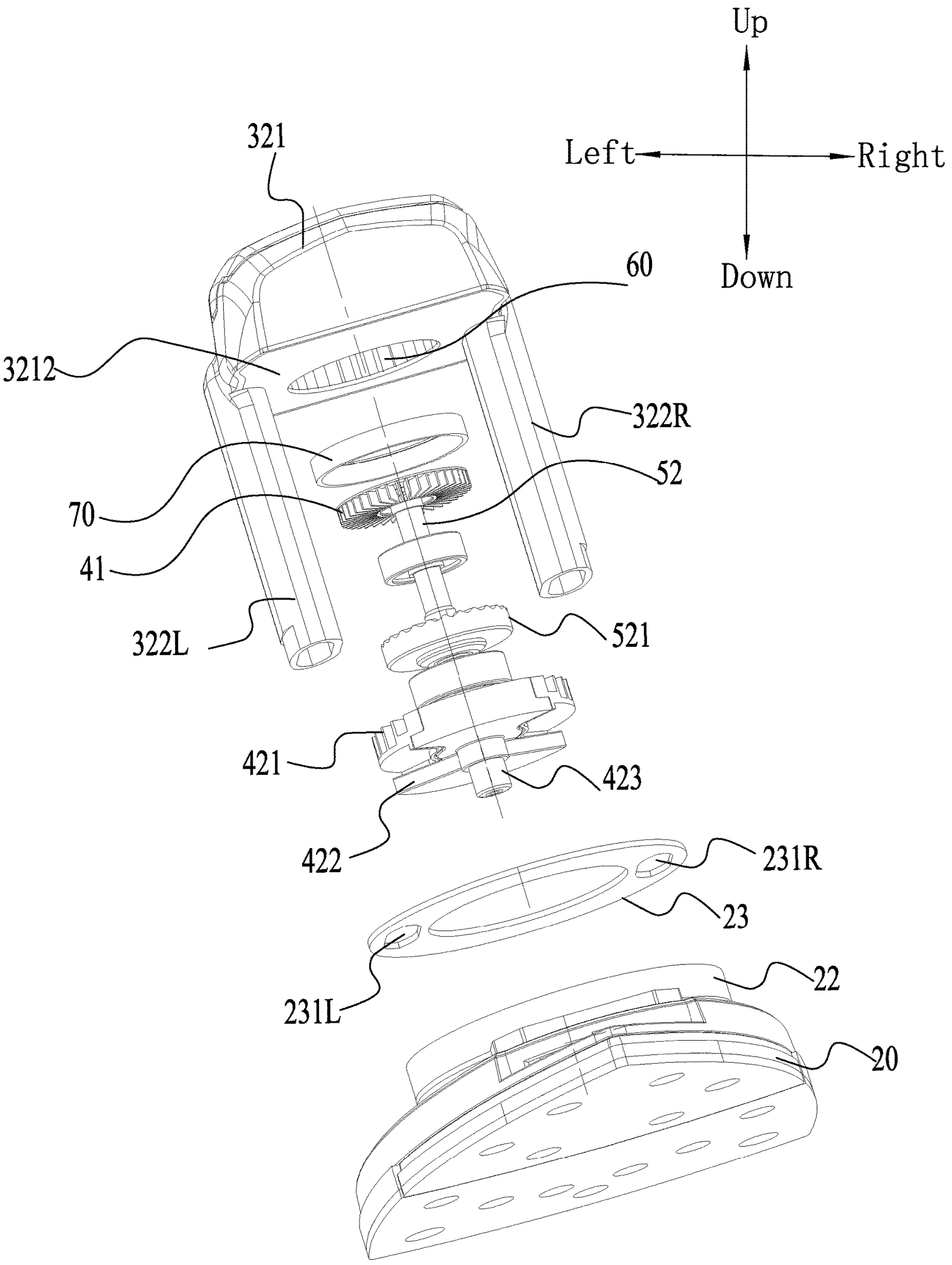
FIG. 20 is an explosion view of a partial structure of the sanding tool of FIG. 16.
Figure 21:
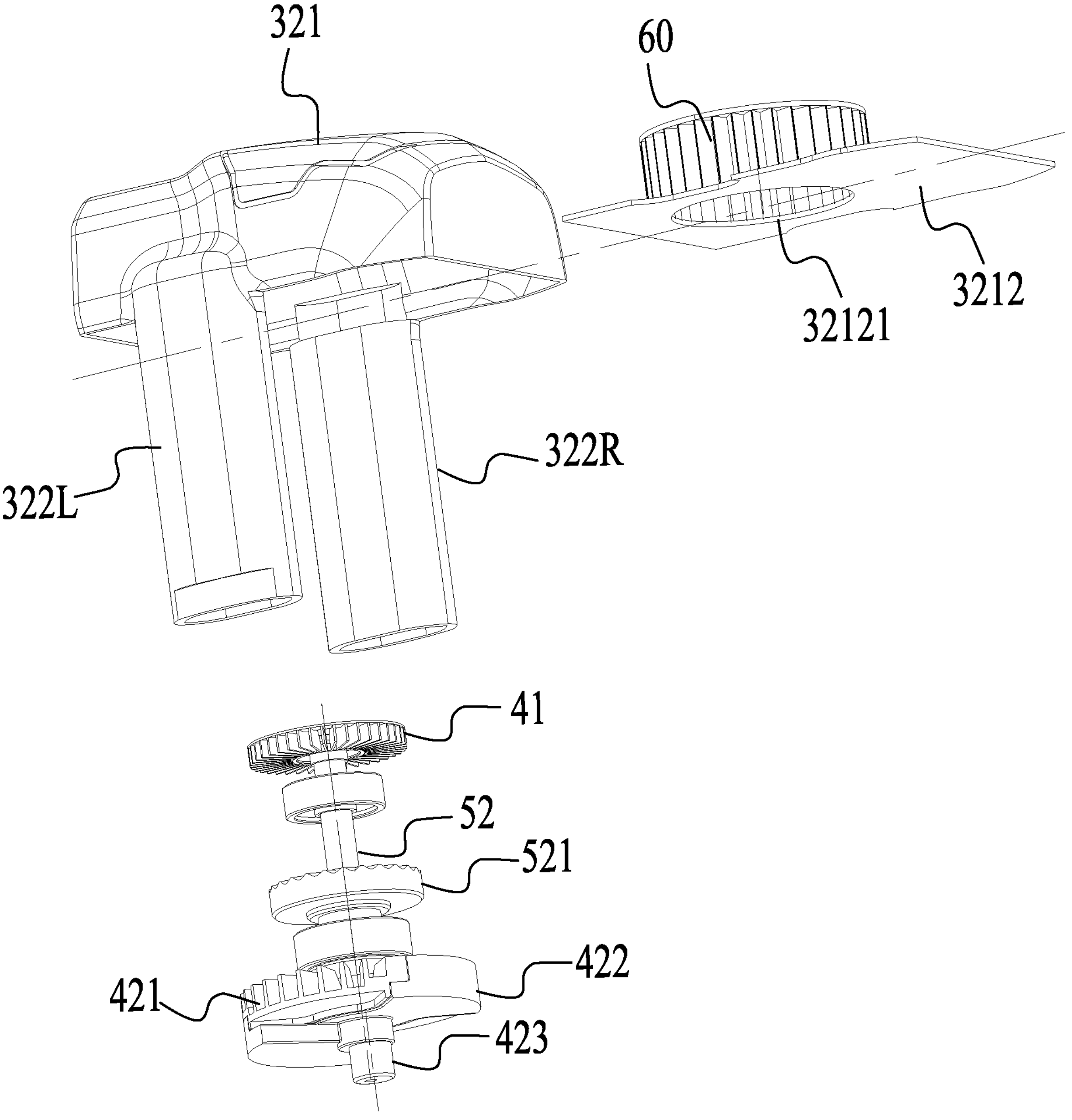
FIG. 21 is another explosion view of a partial structure of the sanding tool of FIG. 16.
Figure 25:
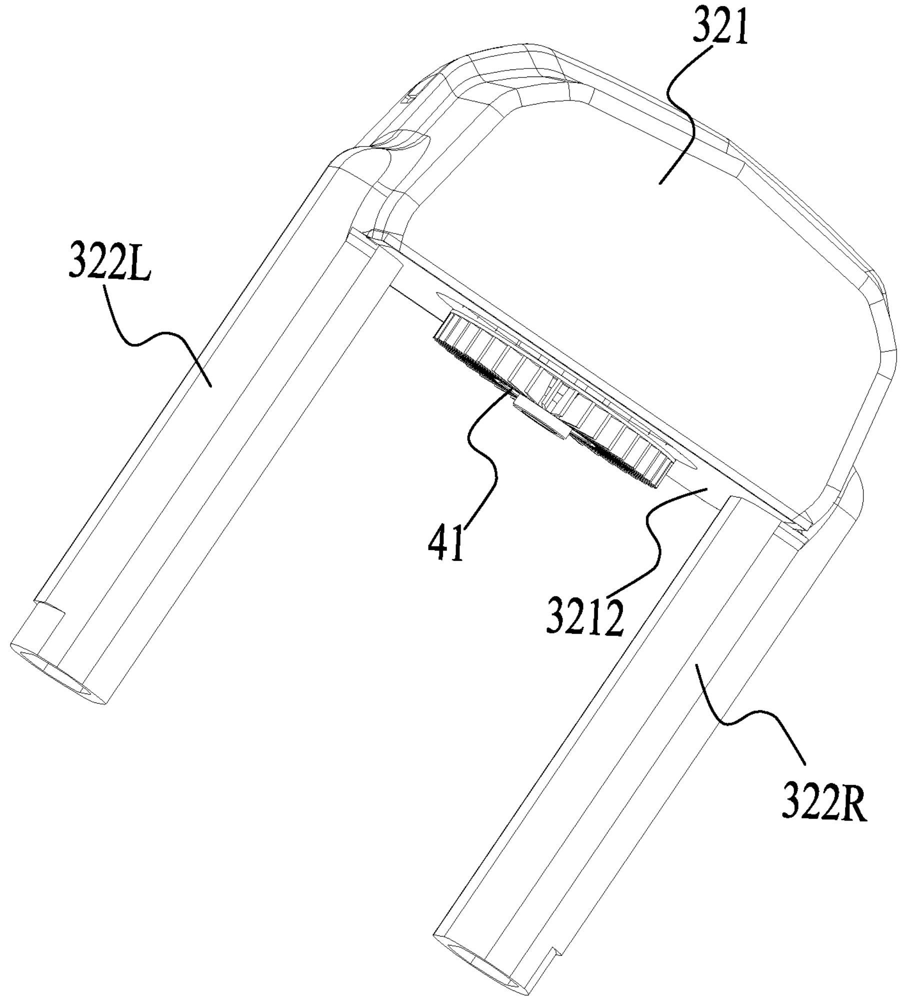
FIG. 25 is a structural view of a mounting position of a dust collecting fan of the sanding tool of FIG. 16.
Figure 26:
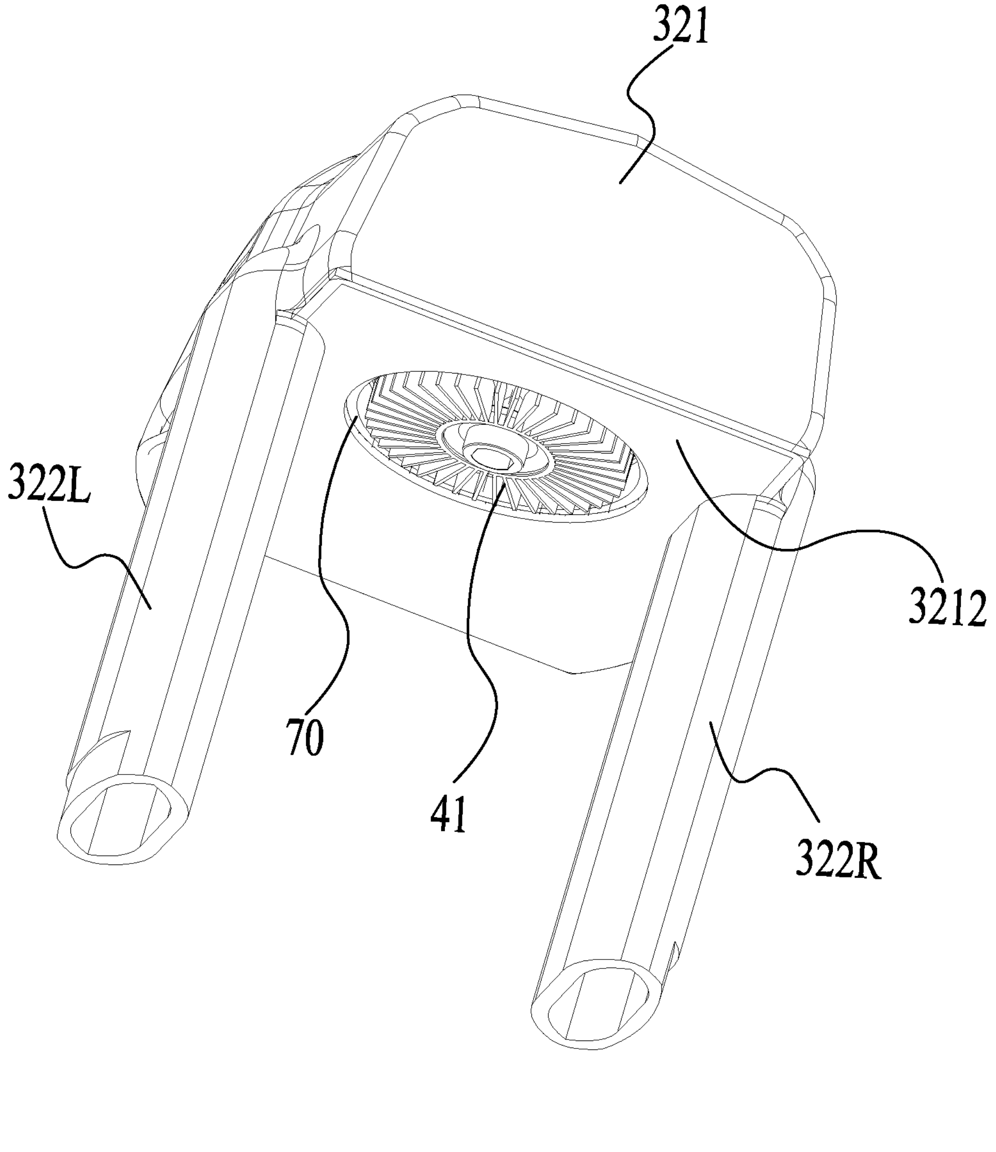
FIG. 26 is a structural view of another mounting position of a dust collecting fan of the sanding tool of FIG. 16.
Figure 27:
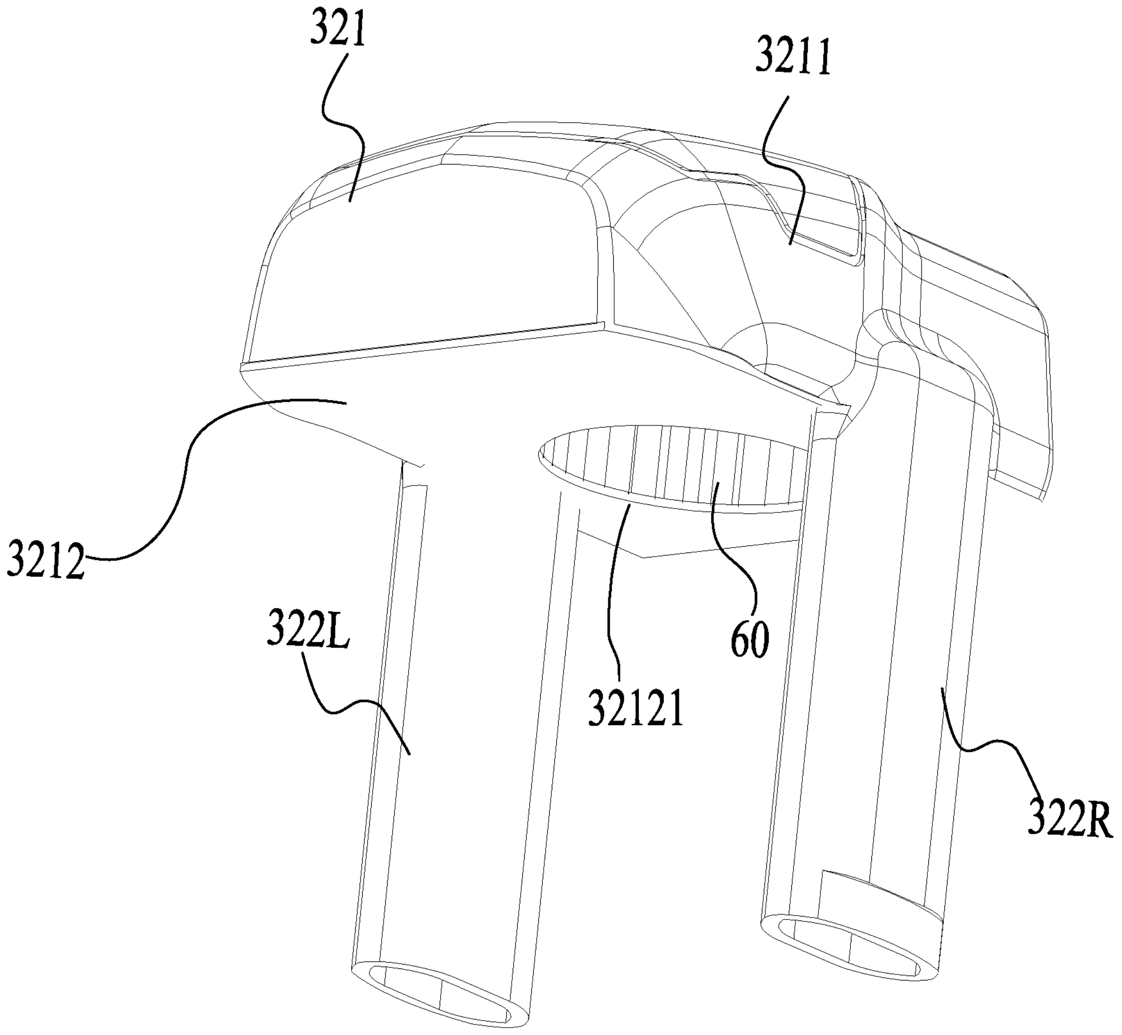
FIG. 27 is a schematic view of a functional casing of the sanding tool of FIG. 16.

Referring to FIGS. 17 and 18, the casing 30 includes the body casing 31 and the functional casing 32. The body casing 31 includes a left casing 311 and a right casing 312. During assembly, the left casing 311 and the right casing 312 are closed to the middle respectively in left and right directions. The left casing 311 is provided with a left body installation hole 311L, the right casing 312 is provided with a right body installation hole 312R, and two dust collection channels of the functional casing 32 are detachably installed on the base plate assembly 20 through the two body installation holes. In this example, as shown in FIGS. 25 to 27, the functional casing 32 is a saddle-shaped casing and includes a dust collection box 321 at the top of the saddle-shaped casing and two (left and right) dust collection channels 322 disposed at a lower end of the dust collection box 321 and integrally formed with the dust collection box 321. A holding portion 3211 is formed on the dust collection box 321 of the functional casing 32. The holding portion 3211 is disposed at a top end of the functional casing 32. The holding portion 3211 is a recess formed through the functional casing 32 being recessed inwards. In this example, the holding portion 203 is designed with an arc conforming to the mechanics of one-hand holding or two-hand holding. In this example, the holding portion 3211 is equivalent to an upper cover of the dust collection box 321, and a lower cover 3212 of the dust collection box is detachably installed to a lower end of the dust collection box 321.

In an example, the motor shaft 511 is perpendicular to the two (left and right) dust collection channels 322 and disposed at the lower end of the dust collection box 321 and a middle position between the two (left and right) dust collection channels 322, that is, the motor 51 is disposed transversely in an empty space in the middle of the saddle-shaped functional casing 32. Preferably, the motor shaft 511 may be perpendicular to a connection line between the two (left and right) dust collection channels 322 or may have a certain included angle with the intermediate connection line.

In this example, the lower cover 3212 of the dust collection box is provided with a filter installation port 32121. Therefore, a filter 60 is detachably installed in the filter installation port 32121 and configured to cover the filter installation port 32121, so as to form an accommodation space. In this example, the filter 60 is a pleated filter paper and covers the filter installation port 32121 to prevent dust from flying out of a gas discharge port 313 on the body casing 31 along with an airflow, thereby avoiding air pollution.

In the examples of the present disclosure, as shown in FIG. 25, the dust collection fan 41 may be disposed at a certain distance away from the filter installation port 32121, and the preceding distance may be generally set to zero. That is, the dust collection fan 41 can close the filter installation port 32121. At this time, since the dust collection fan 41 is not in the accommodation space, a wind force of the dust collection fan 41 does not cause interference to the filter 60, that is, the dust collection fan 41 does not blow away the filter 60.

In the examples of the present disclosure, as shown in FIGS. 21 to 26, the dust collection fan 41 may be disposed in an accommodation space 61 formed by the filter 60. When the dust collection fan 41 is disposed in the accommodation space, the wind force of the dust collection fan 41 may blow away the filter 60. To prevent the preceding case, in the examples of the present application, a windshield 70 is disposed on an inner side of a ring wall of the accommodation space 61 to block the wind generated by the dust collection fan 41 and prevent the filter 60 from being blown away or loosened. Through the preceding reasonable design and layout, the dust collection fan 41 is accommodated in the accommodation space, which is equivalent to accommodating the height of the dust collection fan 41 in the dust collection box 321, thereby further reducing the height of the entire machine and ensuring the compactness in structure of the entire machine.

In the examples of the present disclosure, the base plate assembly 20 is further provided with a collection plate 22, where the collection plate 22 communicates with a dust suction port on the base plate assembly 20 and is configured to collect dust generated when the sanding tool 10 is operating. To prevent dust in the collection plate 22 from entering the inside of the tool and affecting the normal operation of the tool, a collection plate cover 23 is provided for closing the collection plate 22 so that dust entering the collection plate 22 through the dust suction port of the base plate remains in the collection plate 22. It is to be noted that two internal installation holes 231 are disposed on the collection plate cover 23, and the dust collection channels 322 are inserted into the body installation holes on the body casing 31 and then enters the collection plate 22 through the internal installation holes 231 on the collection plate cover 23 so that the dust in the collection plate 22 can be moved into the dust collection box 321 through the dust collection channels 322. It is to be understood that the wind force generated through the rotation of the dust collection fan 41 forms a negative pressure in the dust collection box 321 through the accommodation space 61 so that dust generated during the sanding of the base plate assembly 20 is sucked into the collection plate 22 through the dust suction port of the base plate under the drive of the rotating airflow generated through the rotation of the dust collection fan 41, enters the dust collection channels 322 through entrances of the dust collection channels 322 in the collection plate 22, and finally is collected in the dust collection box 321 through the dust collection channels 322.

Figure 22:
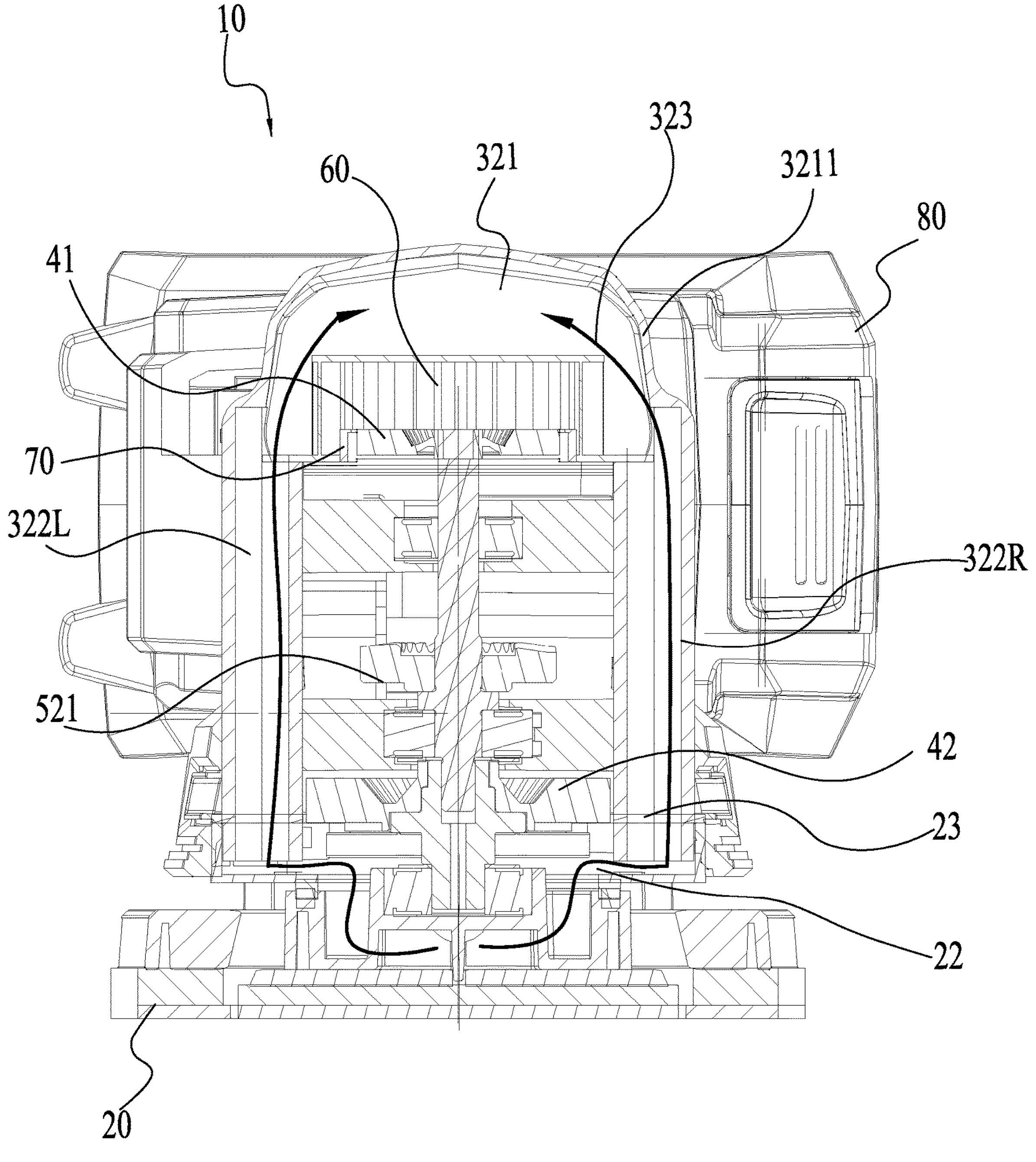
FIG. 22 is a sectional view of the sanding tool of FIG. 16.

Referring to FIG. 22, a dust discharge path 323 roughly indicates a path of dust from the dust suction port on the base plate 21 into the collection plate 22, the dust collection channels 322, and the dust collection box 321.

In the examples of the present application, the functional casing 32 may be transparent, and the user can directly see the degree of accumulation of dust in the dust collection channels 322 and the dust collection box 321 so that the dust can be cleaned up with more timeliness.

In addition, referring to the tool shown in FIGS. 16 and 17, the body casing 31 and the functional casing 32 have substantially the same height, and the dust collection channels 322 of the functional casing 32 penetrate the body casing 31 without increasing the height of the entire machine.

Through the preceding design, the dust collection box 321 and the dust collection channels 322 are transparent and integrally formed, and the dust collection channels 322 directly suck dust from the base plate or from the collection plate 22 so that the dust collection box 321 and the dust collection channels 322 are more convenient to remove and install with increased visibility; at the same time, since the functional casing 32 has substantially the same height as the body casing 31, the height of the entire machine is not increased though the dust collection box 321 is disposed at the top of the entire machine, thereby ensuring the compactness in structure of the entire machine.

Figure 28:
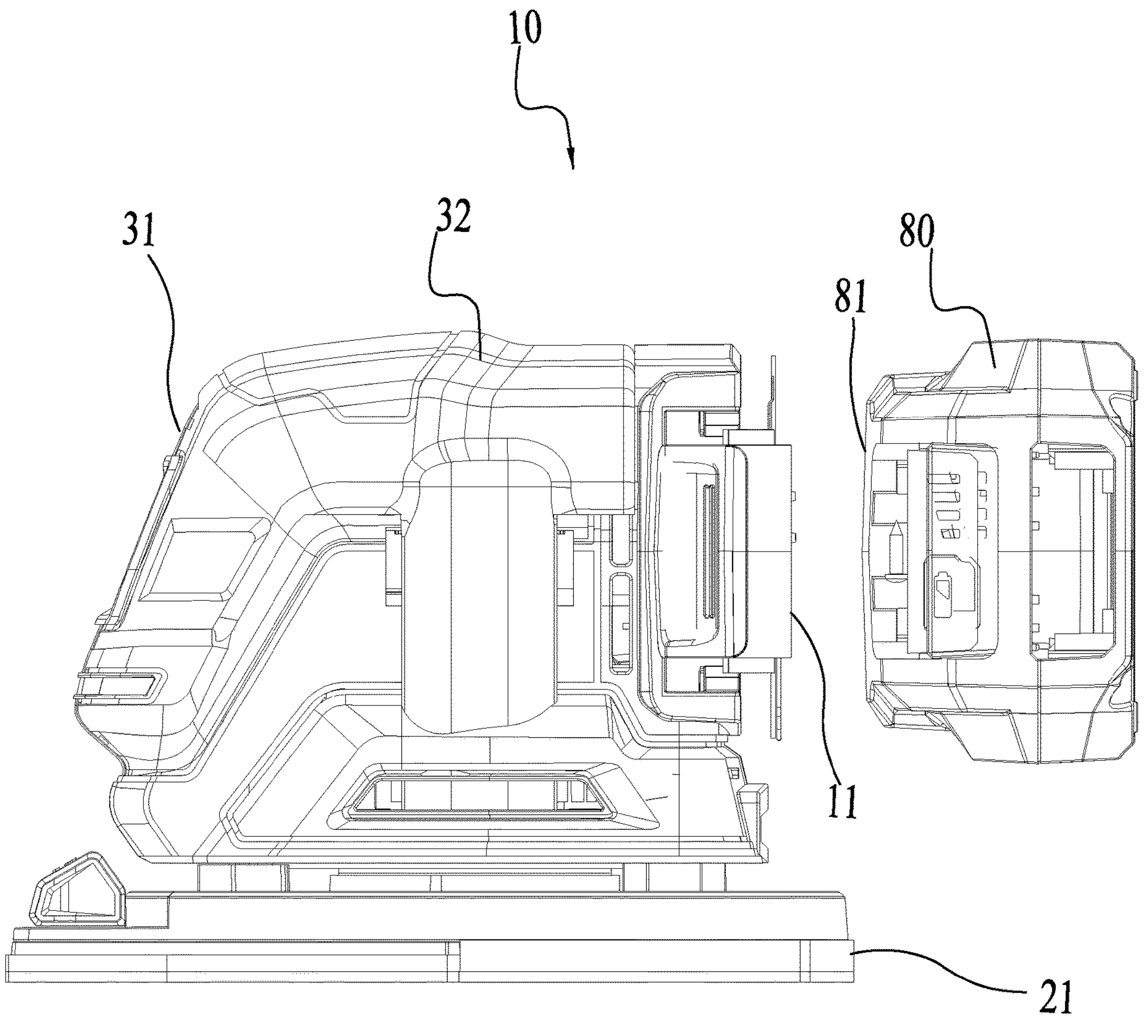
FIG. 28 is a schematic view of the combination of a battery pack and the sanding tool of FIG. 16.

In this example, the power supply of the tool 10 is the battery pack 80. As shown in FIG. 28, the battery pack 80 includes a coupling surface 81, and the coupling surface 81 of the battery pack 80 is connected to a coupling portion 11 of the sanding tool 10. The coupling surface 81 refers to a surface of the battery pack 80 on which a connection terminal is disposed and is substantially a plane. A direction along which the battery pack 80 is plugged in and out is parallel to a plane where the base plate 21 is located. In a specific implementation, the coupling surface 81 is substantially perpendicular to the base plate 21 and coupled to the coupling portion 11 of the tool 10. It is to be noted that the battery pack 80 has the longest dimension in the direction along which the battery pack 80 is plugged in and out. It is to be understood that when the battery pack 80 is installed to the tool 10 in the preceding manner, the direction where the battery pack 80 has the longest dimension is parallel to the base plate and the coupling surface 81 is substantially perpendicular to the base plate 21, which is equivalent to the battery pack 80 being transversely plugged into the entire machine, so that the smaller height of the entire machine can be obtained.

Through the preceding reasonable layout and design, the battery pack and the motor are disposed transversely on two sides of the output shaft, respectively, the motor is disposed transversely, and the battery pack is plugged transversely, thereby ensuring that the battery pack and the motor are disposed without increasing the height or length of the entire machine. In this manner, the compactness of the entire machine is ensured.

It is to be noted that the above are merely preferred examples of the present disclosure and technical principles used therein. It is appreciated by those skilled in the art that the present disclosure is not limited to the examples described herein. Those skilled in the art can make various apparent modifications, adaptations, and substitutions without departing from the scope of the present disclosure. Therefore, while the present disclosure has been described in detail through the preceding examples, the present disclosure is not limited to the preceding examples and may include more other equivalent examples without departing from the concept of the present disclosure. The scope of the present disclosure is determined by the scope of the appended claims.

What is claimed is:

1. A sanding tool, comprising:

a machine body comprising a casing;

a battery pack disposed at a rear end of the machine body;

a base plate assembly comprising a base plate;

a drive mechanism disposed in the casing and comprising a motor, an output shaft, and a transmission assembly, wherein the motor has a motor shaft extending along and rotating around a first axis, the output shaft extends along and rotates around a second axis, the transmission assembly comprises a first gear installed on the output shaft and a second gear installed on the motor shaft and engaged with the first gear, and the output shaft transmits power to the base plate assembly through the transmission assembly to drive the base plate assembly to move; and a control mechanism electrically connected to the motor and configured to control the sanding tool to operate, wherein the base plate is located on and extends along a first plane;

wherein the first axis of the motor shaft is parallel with the first plane, and the second axis of the output shaft is perpendicular to the first plane such that the first axis and the second axis form an included angle, wherein the first axis of the motor shaft is located at a staggered distance from the second axis of the output shaft, and the staggered distance extends in a lateral radial direction from the second axis to the first axis, such that the first axis and the second axis do not intersect, and wherein the battery pack and the motor are disposed on two sides of the output shaft.

2. The sanding tool of claim 1, wherein the battery pack comprises a coupling surface on which a battery pack terminal is disposed and the coupling surface is substantially perpendicular to the base plate and coupled to a coupling portion of the machine body.

3. The sanding tool of claim 2, wherein the coupling surface of the battery pack is substantially parallel to the coupling portion of the machine body.

4. The sanding tool of claim 1, wherein a second included angle between a coupling surface of the battery pack and the first plane where the base plate is located is greater than or equal to 0° and less than or equal to 120°.

5. The sanding tool of claim 1, wherein the first axis of the motor shaft passes through the battery pack.

6. The sanding tool of claim 1, further comprising a fan assembly, wherein the fan assembly comprises cooling fan blades configured to form a cooling air path, the cooling air path comprises a first cooling air path and a second cooling air path, the first cooling air path passes through the motor, the second cooling air path passes through the control mechanism, and the first cooling air path and the second cooling air path intersect at the cooling fan blades.

7. The sanding tool of claim 6, wherein the casing is provided with a first air inlet, a second air inlet, and an air outlet, the air outlet is disposed on the casing proximate the cooling fan blades, the first air inlet is disposed in upstream of the motor along the first cooling air path, and the second air inlet is disposed upstream of the control mechanism along the second cooling air path.

8. The sanding tool of claim 7, wherein the first air inlet is disposed on a front side of the casing and the second air inlet is disposed on a rear side of the casing.

9. The sanding tool of claim 1, wherein a ratio of a height of the battery pack to a height of the sanding tool is less than or equal to 0.7.

10. The sanding tool of claim 1, wherein the staggered distance between the first axis and the second axis is less than or equal to a radius of the first gear.

11. The sanding tool of claim 1, wherein a first projection of the motor extending in a vertical direction perpendicular to the base plate and a second projection of the battery pack extending in the vertical direction.

12. The sanding tool of claim 1, wherein a ratio of a diameter of the motor to a height of the sanding tool is greater than or equal to 0.2 and less than or equal to 0.6.

13. The sanding tool of claim 1, wherein a ratio of a diameter of the motor to a height of the sanding tool is greater than or equal to 0.3 and less than or equal to 0.4.

14. The sanding tool of claim 1, wherein a ratio of a distance between a center of the motor and the second axis of the output shaft to a length of the base plate is less than or equal to 0.5.

15. A sanding tool, comprising:

a machine body comprising a casing;

a battery pack configured to supply a power source to the sanding tool;

a base plate assembly comprising a base plate;

a drive mechanism disposed in the casing and comprising a motor and an output shaft connected by a transmission assembly, wherein the motor has a motor shaft extending along and rotating around a first axis, the output shaft extends along and rotates around a second axis, the transmission assembly comprises a first gear installed on the output shaft and a second gear installed on the motor shaft and engaged with the first gear, and the output shaft transmits power to the base plate assembly through the transmission assembly to drive the base plate assembly to move; and a control mechanism electrically connected to the motor and configured to control the sanding tool to operate, wherein the base plate is located on and extends along a first plane;

wherein a direction along which the battery pack is plugged in and out of a battery pack accommodating portion of the machine body is parallel to the first plane where the base plate is located, wherein the first axis of the motor shaft is parallel with the first plane, and the second axis of the output shaft is perpendicular to the first plane such that the first axis and the second axis form an included angle, wherein the first axis of the motor shaft is located at a staggered distance from the second axis of the output shaft, and the staggered distance extends in a lateral radial direction from the second axis to the first axis, such that the first axis and the second axis do not intersect, and wherein a ratio of a diameter of the motor to a height of the sanding tool is greater than or equal to 0.2 and less than or equal to 0.6.

16. The sanding tool of claim 15, wherein the ratio of the diameter of the motor to the height of the sanding tool is greater than or equal to 0.3 and less than or equal to 0.4.

17. The sanding tool of claim 15, wherein a projection of the battery pack on the first plane where the base plate is located overlaps with the base plate.

18. A sanding tool, comprising:

a machine body comprising a casing;

a battery pack configured to supply a power source to the sanding tool;

a base plate assembly comprising a base plate;

a drive mechanism disposed in the casing and comprising a motor and an output shaft connected by a transmission assembly, wherein the motor has a motor shaft extending along and rotating around a first axis, the output shaft extends along and rotates around a second axis, the transmission assembly comprises a first gear installed on the output shaft and a second gear installed on the motor shaft and engaged with the first gear, and the output shaft transmits power to the base plate assembly through the transmission assembly to drive the base plate assembly to move; and a control mechanism electrically connected to the motor and configured to control the sanding tool to operate, wherein the base plate is located on and extends along a first plane;

wherein the first axis of the motor shaft is parallel with the first plane, and the second axis of the output shaft is perpendicular to the first plane such that the first axis and the second axis form an included angle, and wherein the first axis of the motor shaft is located at a staggered distance from the second axis of the output shaft, and the staggered distance extends in a lateral radial direction from the second axis to the first axis, such that the first axis and the second axis do not intersect, wherein the battery pack and the motor are disposed on two sides of the output shaft.

19. The sanding tool of claim 18, wherein a ratio of a distance between a center of the motor and the second axis of the output shaft to a length of the base plate is less than or equal to 0.5.

* * * * *